(12) United States Patent
Chen et al.

(10) Patent No.: US 8,930,562 B2
(45) Date of Patent: Jan. 6, 2015

(54) ARRANGING SUB-TRACK FRAGMENTS FOR STREAMING VIDEO DATA

(75) Inventors: Ying Chen, San Diego, CA (US); Marta Karczewicz, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 414 days.

(21) Appl. No.: 12/840,146

(22) Filed: Jul. 20, 2010

(65) Prior Publication Data

US 2012/0023250 A1    Jan. 26, 2012

(51) Int. Cl.
| | |
|---|---|
| G06F 13/00 | (2006.01) |
| H04L 29/06 | (2006.01) |
| H04N 21/845 | (2011.01) |
| H04N 21/2343 | (2011.01) |
| H04N 21/236 | (2011.01) |
| H04L 29/08 | (2006.01) |
| H04N 21/442 | (2011.01) |
| H04N 21/462 | (2011.01) |

(52) U.S. Cl.
CPC ...... *H04N 21/234327* (2013.01); *H04L 65/604* (2013.01); *H04N 21/8456* (2013.01); *H04L 65/4084* (2013.01); *H04L 65/602* (2013.01); *H04L 65/607* (2013.01); *H04L 67/04* (2013.01); *H04N 21/23608* (2013.01); *H04N 21/4424* (2013.01); *H04N 21/462* (2013.01)
USPC ........................................................ 709/231

(58) Field of Classification Search
CPC . H04L 65/604; H04L 65/4084; H04L 65/602; H04L 65/607; H04L 65/04; H04N 21/8456; H04N 21/234327; H04N 21/23608; H04N 21/4424; H04N 21/462
USPC ........................................................ 709/231
See application file for complete search history.

(56) References Cited

U.S. PATENT DOCUMENTS

| 7,536,470 B2 | 5/2009 | Li et al. |
|---|---|---|
| 2005/0169379 A1 | 8/2005 | Shin et al. |

(Continued)

FOREIGN PATENT DOCUMENTS

WO    WO2008148708 A1    12/2008

OTHER PUBLICATIONS

Amon P. et al., "File Format for Scalable Video Coding", IEEE Transactions on Circuits and Systems for Video Technology, IEEE Service Center, Piscataway, NJ, US, vol. 17, No. 9, Sep. 1, 2007, pp. 1174-1185, XP011193013, ISSN: 1051-8215, DOI:10.1109/TCSVT.2007.905521.

(Continued)

*Primary Examiner* — Robert B Harrell
(74) *Attorney, Agent, or Firm* — Brent A. Boyd

(57) ABSTRACT

A video file may include movie fragments divided into sub-track fragments that store all pictures of common hierarchical levels for the respective hierarchical levels. In one example, an apparatus includes an interface configured to output data according to a streaming protocol, and a control unit configured to assemble encoded video data into a plurality of sub-track fragments, each of the sub-track fragments comprising a plurality of hierarchically related video pictures of the encoded video data, wherein the plurality of hierarchically related video pictures each correspond to a common hierarchical layer receiving a request in accordance with the streaming protocol, wherein the request specifies at least one of the plurality of sub-track fragments, and, in response to the request, cause the interface to output the plurality of hierarchically related video pictures of the at least one of the plurality of sub-track fragments.

54 Claims, 9 Drawing Sheets

(56) References Cited

U.S. PATENT DOCUMENTS

| | | | |
|---|---|---|---|
| 2006/0083308 A1 | 4/2006 | Schwarz et al. | |
| 2006/0262856 A1 | 11/2006 | Wu et al. | |
| 2007/0081586 A1 | 4/2007 | Raveendran et al. | |
| 2007/0127576 A1 | 6/2007 | Henocq et al. | |
| 2009/0031021 A1* | 1/2009 | Bae et al. | 709/224 |

OTHER PUBLICATIONS

Anonymous: "Text of ISO/IEC 14496-12 3rd Edition", 83 MPEG Meeting; Jan. 14, 2008-Jan. 18, 2008; Antalya; (Motion Pictureexpert Group or ISO/IEC JTC1/SC29/WG11), No. N9678, Apr. 22, 2008, XP030016172.

Anonymous: "Text of ISO/IEC 14496-12:2008/PDAM 2 Sub-track selection & switching", 91. Mpeg Meeting; Jan. 18, 2010-Jan. 22, 2010; Kyoto; (Motion Picture Expertgroup or ISO/IEC JTC1/SC29/WG11), No. N11137, Jan. 22, 2010, XP030017634, ISSN: 0000-0030.

Fielding et al., "RFC 2616: Hypertext Transfer Protocol HTTP/1.1", Internet Citation, Jun. 1999, pp. 165, XP002196143, Retrieved from the Internet: URL:http://www.rfc-editor-org/ [retrieved on Apr. 15, 2009].

International Search Report and Written Opinion—PCT/US2011/044745—ISA/EPO—Dec. 21, 2011.

ISO/IEC JTC1/SC29/WG11: "Requirements on HTTP Streaming of MPEG Media", 92. MPEG Meeting; Apr. 19, 2010-Apr. 23, 2010; Dresden; No. N11340, May 14, 2010, XP030017837, ISSN: 0000-0029.

McCanne, et al., "Low-Complexity Video Coding for Receiver-Driven Layered Multicast", IEEE Journal on Selected Areas in Communication IEEE Service Center, Aug. 1, 1997, vol. 15, No. 6, pp. 983-1001, Piscataway, US, XP011054678, ISSN: 0733-8716.

David Singer et al., "ISO/IEC 14496-15/FDIS, International Organization for Standardization Organization Internationale De Normalization ISO/IEC JTC1/SC29/WG11 Coding of Moving Pictures and Audio", ISO/IEC 2003, Aug. 11, 2003, pp. 1-34.

Frojdh et al., "File format sub-track selection and switching," ISO-IEC JTC1/SC29/WG11 MPEG2009 M16665, London UK., Jul. 2009, 14 pp.

Heiko Schwarz, et al., "Overview of the Scalable Video Coding Extension of the H.264/AVC Standard", IEEE Transactions on Circuits and Systems for Video Technology, vol. 17, No. 9, September 2007, pp. 1103-1120.

Information Technology—Generic Coding of Moving Pictures and Audio: Systems, Amendment 4: Transport of Multivew Video over ITU-T Rec H.222.0 | ISO/IEC 13818-1 "Text of ISO/IEC 13818-1:2007/FPDAM 4—Transport of Multiview Video over ITU-T Rec H.222.0 | ISO/IEC 13818-1," Lausanne, Switzerland, 2009, 21 pp.

International Standard ISO/IEC 14496-12, Information Technology—Coding of audio-visual objects—Part 12: ISO base media file format, Third Edition, Oct. 15, 2008, 120 pp.

ISO/IEC 13818-1, "Information technology—Generic coding of moving pictures and associated audio information: Systems," Second edition, Dec. 1, 2000, 174 pp.

"Joint Draft 8.0 on Multiview Video Coding", 28th JVT meeting, Hannover, Germany, Jul. 2008. available from http:// wftp3. itu.int/av-arch/jvt-site/2008_07_Hannover/JVT-AB204.

Sullivan et al., Document: JVT-AA007, "Editors' Draft Revision to ITU-T Rec. H.264|ISO/IEC 14496-10 Advanced Video Coding—In Preparation for ITU-T SG 16 AAP Consent (in integrated form)," Joint Video Team (JVT) of ISO/IEC MPEG & ITU-T VCEG (ISO/IEC JTC1/SC29/WG11 and ITU-T SG16 Q.6), 30th Meeting: Geneva, CH, Jan. 29-Feb. 3, 2009, pp. 1-683, http://wftp3.itu.int/av-arch/jvt-site/2009_01_Geneva/JVT-AD007.zip.

Thomas Wiegand, et al., "Joint Draft ITU-T Rec. H.264 | ISO/IEC 14496-10 / Amd.3 Scalable video coding", Joint Video Team (JVT) of ISO/IEC MPEG & ITU-T VCEG (ISO/IEC JTC1/SC29/WG11 and ITU-T SG16 Q.6) 24th Meeting: Geneva, Switzerland, Jun. 29-Jul. 5, 2007, pp. 1-559.

Wenger S., "RTP Payload Format for H.264 Video", Network Working Group, Feb. 2005, pp. 1-84.

Lee Jack Y. B., "Chapter 2: Media Compression in: Scalable Continuous Media Streaming Systems", Jan. 1, 2005, pp. 25-42, John Wiley & Sons Ltd., Chichester, West Sussex, England, XP55041298, ISBN: 978-0-47-085754-0.

Pantos, "HTTP Live Streaming draft-pantos-http-live-streaming-02", Informational, Internet-Draft, Intended status: Informational, Expires: Apr. 8, 2010, http://tools.ietf.org/html/draft-pantos-http-live-streaming-02, pp. 1-20, Oct. 5, 2009.

3rd Generation Partnership Project; Technical Specification Group Services and System Aspects; Transparent end-to-end packet switched streaming service (PSS); 3GPP file format (3GP) (Release 9) 3GPP TS 26.244 V9.2.0, Jun. 23, 2010,pp. 47-49.

Fraunhofer Gesellschaft: "Use cases for IVCS release 10—SVC for HTTP adaptive streaming and Scalable High Profile for PC-based UEs", 3GPP TSG-SA4 #59, S4-100519, Jun. 21, 2010, pp. 3.

Taiwan Search Report—TW100125682—TIPO—May 6, 2014.

* cited by examiner

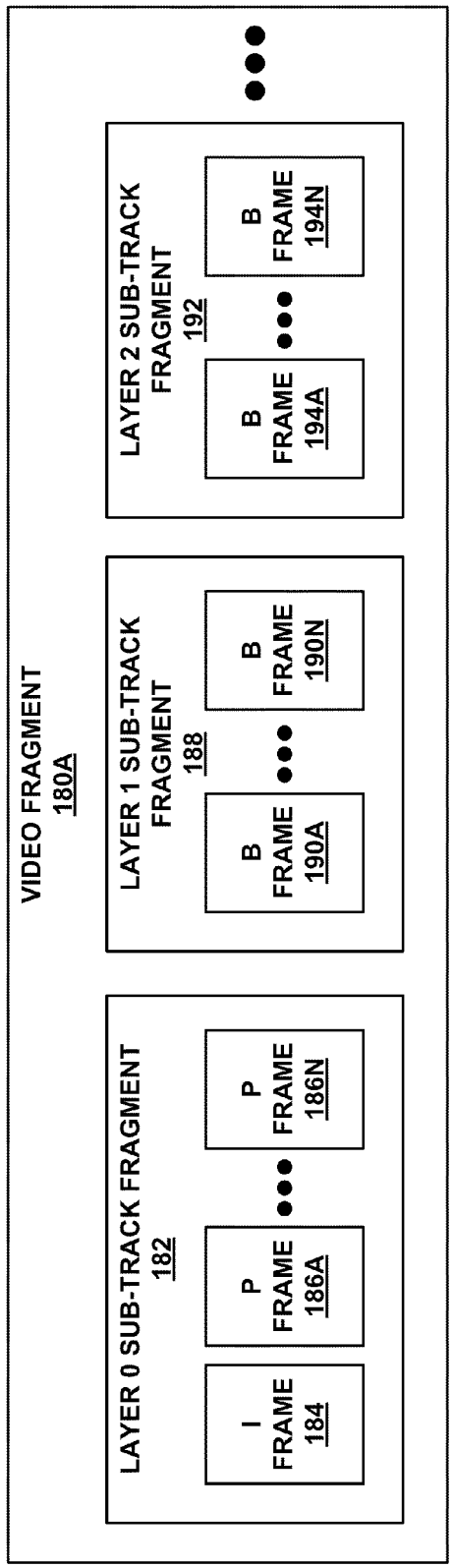
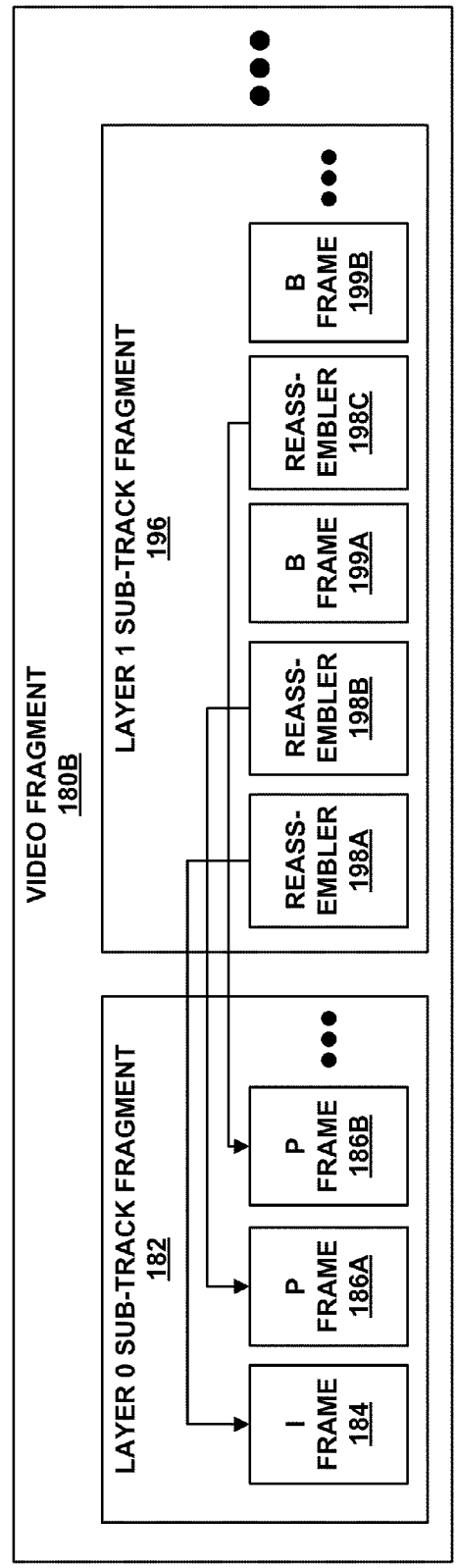
FIG. 4A
FIG. 4B

ARRANGING SUB-TRACK FRAGMENTS FOR STREAMING VIDEO DATA

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/ MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

Efforts have been made to develop new video coding standards based on H.264/AVC. One such standard is the scalable video coding (SVC) standard, which is the scalable extension to H.264/AVC. Another standard is the multi-view video coding (MVC), which becomes the multiview extension to H.264/AVC. A joint draft of MVC is in described in JVT-AB204, "Joint Draft 8.0 on Multiview Video Coding," 28th JVT meeting, Hannover, Germany, July 2008, available at http://wftp3.itu.int/av-arch/jvt-site/2008_07_Hannover/ JVT-AB204.zip. A version integrated into the AVC standard is described in JVT-AD007, "Editors' draft revision to ITU-T Rec. H.264|ISO/IEC 14496-10 Advanced Video Coding—in preparation for ITU-T SG 16 AAP Consent (in integrated form)," 30th JVT meeting, Geneva, CH, February 2009, available at http://wftp3.itu.int/av-arch/jvt-site/2009_ 01_Geneva/JVT-AD007.zip.

SUMMARY

In general, this disclosure describes techniques for creating sub-track fragments of video files to support streaming of video data. Rather than organizing coded video pictures within a video fragment of a video file in a decoding order, the techniques of this disclosure include arranging the coded video pictures in an order according to a hierarchical level or layer to which the coded pictures belong. Each hierarchical layer inside a video fragment may correspond to a respective sub-track fragment. That is, each sub-track fragment may include all coded video pictures of the corresponding hierarchical layer for a particular movie fragment in a continuous byte range of the movie fragment. The video pictures in the sub-track fragment may still follow the decoding order. In this manner, a destination device may submit a single request to retrieve all pictures of the sub-track fragment of a movie fragment. In the context of a video file and transport, encapsulated coded video pictures may also be referred to as video samples.

In one example, a method includes assembling encoded video data into a plurality of sub-track fragments, each of the sub-track fragments comprising a plurality of hierarchically related video pictures of the encoded video data, wherein the plurality of hierarchically related video pictures each correspond to a common hierarchical layer, receiving a request in accordance with a streaming protocol, wherein the request specifies at least one of the plurality of sub-track fragments, and, in response to the request, outputting the plurality of hierarchically related video pictures of the at least one of the plurality of sub-track fragments.

In another example, an apparatus includes an interface configured to output data according to a streaming protocol, and a control unit configured to assemble encoded video data into a plurality of sub-track fragments, each of the sub-track fragments comprising a plurality of hierarchically related video pictures of the encoded video data, wherein the plurality of hierarchically related video pictures each correspond to a common hierarchical layer receiving a request in accordance with the streaming protocol, wherein the request specifies at least one of the plurality of sub-track fragments, and, in response to the request, cause the interface to output the plurality of hierarchically related video pictures of the at least one of the plurality of sub-track fragments.

In another example, an apparatus includes means for assembling encoded video data into a plurality of sub-track fragments, each of the sub-track fragments comprising a plurality of hierarchically related video pictures of the encoded video data, wherein the plurality of hierarchically related video pictures each correspond to a common hierarchical layer, means for receiving a request in accordance with a streaming protocol, wherein the request specifies at least one of the plurality of sub-track fragments, and means for outputting the plurality of hierarchically related video pictures of the at least one of the plurality of sub-track fragments in response to the request.

In another example, a computer program product includes a computer-readable storage medium comprises instructions that, when executed, cause a processor of a source device to assemble encoded video data into a plurality of sub-track fragments, each of the sub-track fragments comprising a plurality of hierarchically related video pictures of the encoded video data, wherein the plurality of hierarchically related video pictures each correspond to a common hierarchical layer, receive a request in accordance with a streaming protocol, wherein the request specifies at least one of the plurality of sub-track fragments, and, in response to the request, output the plurality of hierarchically related video pictures of the at least one of the plurality of sub-track fragments.

In another example, a method includes receiving information from a source device that describes hierarchical levels of video data for a movie fragment and determining a subset of the hierarchical levels of video data to request. For each of the hierarchical levels of the subset, the method includes sending no more than one request to the source device to retrieve all of the video data of the movie fragment at the hierarchical level. The method further includes receiving the video data of the determined subset of the hierarchical levels, and decoding and displaying the received video data.

In another example, an apparatus includes an interface configured to receive information from a source device that describes hierarchical levels of video data for a movie fragment; and a control unit configured to determine a subset of the hierarchical levels of video data to request, wherein for each of the hierarchical levels of the subset, the control unit is configured to send no more than one request to the source device to retrieve all of the video data of the movie fragment at the hierarchical level. The interface is further configured to receive the video data of the determined subset of the hierarchical levels in response to the requests.

In another example, an apparatus includes means for receiving information from a source device that describes hierarchical levels of video data for a movie fragment, means for determining a subset of the hierarchical levels of video data to request, means for sending, for each of the hierarchical levels of the subset, no more than one request to the source device to retrieve all of the video data of the movie fragment at the hierarchical level, means for receiving the video data of the determined subset of the hierarchical levels, and means for decoding and displaying the received video data.

In another example, a computer program product includes a computer-readable storage medium comprising instructions that cause a processor of a destination device to receive information from a source device that describes hierarchical levels of video data for a movie fragment, determine a subset of the hierarchical levels of video data to request, for each of the hierarchical levels of the subset, send no more than one request to the source device to retrieve all of the video data of the movie fragment at the hierarchical level, receive the video data of the determined subset of the hierarchical levels, and decode and display the received video data.

The details of one or more examples are set forth in the accompanying drawings and the description below. Other features, objects, and advantages will be apparent from the description and drawings, and from the claims.

BRIEF DESCRIPTION OF DRAWINGS

FIG. 4A is a block diagram illustrating an example movie fragment.

FIG. 4B is a block diagram illustrating an example movie fragment that includes reassembler objects.

DETAILED DESCRIPTION

Figure 1:
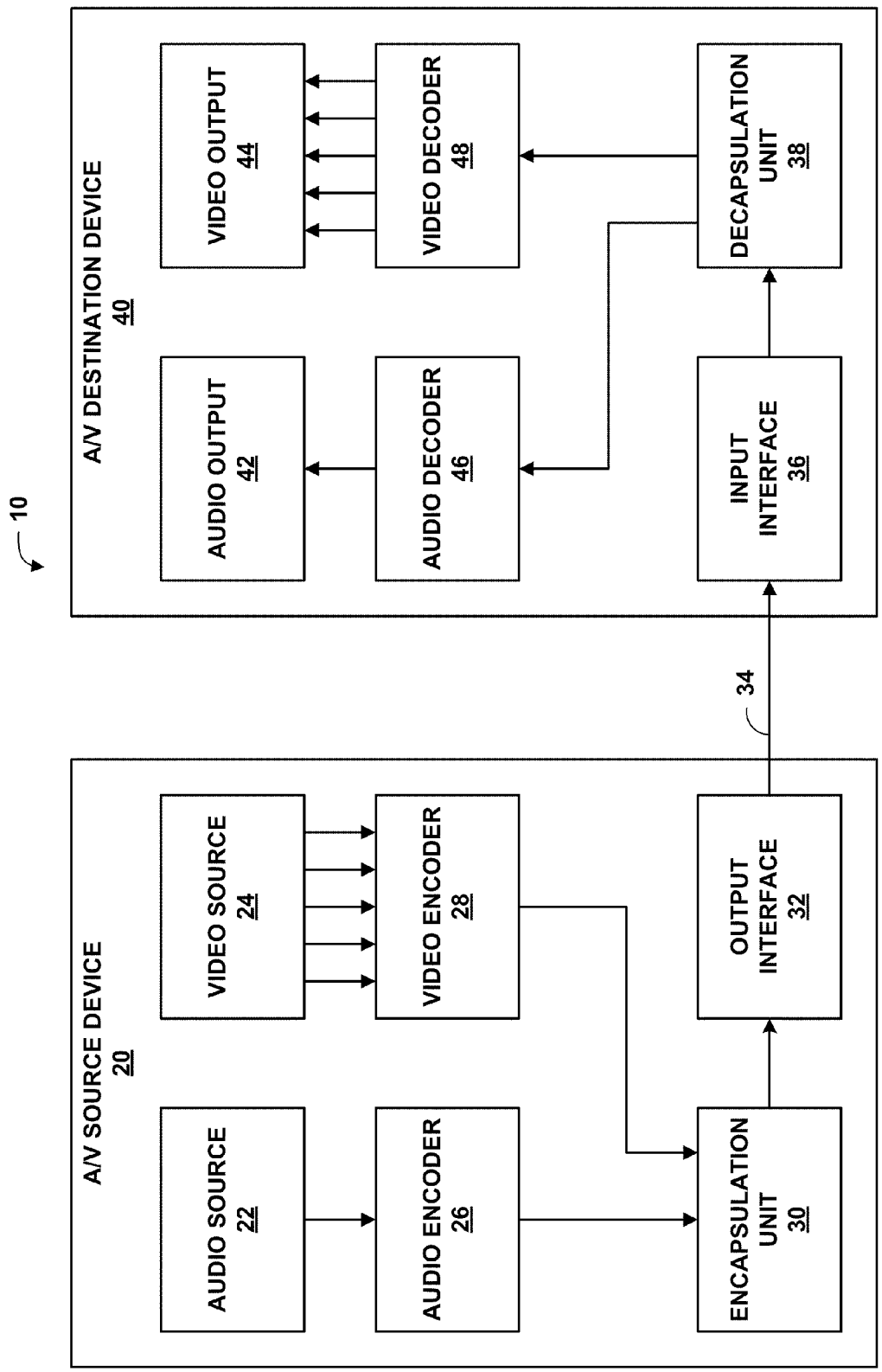
FIG. 1 is a block diagram illustrating an example system in which an audio/video (A/V) source device sends audio and video data to an A/V destination device.

In general, this disclosure describes techniques for arranging sub-track fragments of video files to support streaming of video data. In particular, coded video pictures of a track fragment may be arranged according to a hierarchical layer to which the coded video pictures belong. In this disclosure, coded video pictures may also be referred to as coded video samples, or simply as "samples" or "pictures." In this manner, coded video pictures of a common layer may be arranged contiguously within a video file. Accordingly, a destination device may retrieve coded pictures of a particular hierarchical layer within a movie fragment using a single request. For the example of HTTP streaming, the single request may comprises an HTTP partial GET request specifying a byte range of the coded video pictures up to the desired hierarchical layer.

A track fragment can be a fragment of a video representation of the ISO base media file format, or a fragment of an MPEG-2 Systems stream, which can be any type of the following: packetized elementary stream (PES), program stream (PS), or transport stream (TS). In an MPEG-2 transport stream (TS), packets corresponding to access units are conventionally ordered in decoding order. An access unit may be segmented into multiple transport packets in a TS stream. In the case where the track fragment is defined as a continuous part of the MPEG-2 Systems stream, the track fragment may be presented as a file unit, e.g., a file or a file segment. The techniques of this disclosure may include reordering the access unit in a fragment into several sub-track fragments, each of which may correspond to a respective hierarchical layer of the access units (coded pictures) such that and coded pictures of a common hierarchical layer are presented continuously in a portion of the stream. The sub-track fragments in a track fragment may be arranged according to decoding order. In this manner, coded video pictures of a common layer may be arranged contiguously within a video file. Accordingly, a destination device may retrieve all coded pictures up to a particular hierarchical layer within a movie fragment using a single request, e.g., an HTTP partial GET request specifying a byte range of the coded video pictures up to the desired hierarchical layer.

As an example, Advanced Video Coding (AVC) file format specifies that coded video pictures are arranged in a decoding order, in any track fragment or movie fragment. A group of pictures (GOP) may have a number of pictures encoded using various prediction schemes, e.g., intra-prediction (I-pictures) and inter-prediction (P-pictures and B-pictures). I-pictures may be encoded without reference to other pictures, P-pictures may be encoded relative to one or more reference pictures in a single direction, and B-pictures may be encoded relative to one or more pictures in both directions (forward and backward in a video sequence).

An inter-coded picture may have a hierarchical level equal to or greater than the hierarchical level of the reference picture for the inter-coded picture. An example sequence of pictures in display order may be $I_0B_3B_2B_3B_1B_3B_2B_3P_0$, where the letter indicates the encoding type for each picture and the number, in this case, indicates the hierarchical level to which the picture corresponds. Assume for purposes of illustration that each picture is associated with a numerical index corresponding to the picture's position in display order. As indicated above, the example sequence is set out in display order. To decode an inter-prediction encoded picture, a reference picture for the encoded picture may first be decoded. Table 1 below provides an example decoding order for this example sequence, where the subscript number refers to the display order of the picture:

TABLE 1

| | Pictures in Display Order | | | | | | | | |
|---|---|---|---|---|---|---|---|---|---|
| | $I_0$ | $B_1$ | $B_2$ | $B_3$ | $P_4$ | $B_5$ | $B_6$ | $B_7$ | $P_8$ |
| Temporal hierarchical level | 0 | 2 | 1 | 2 | 0 | 2 | 1 | 2 | 0 |
| Decoding Order | 0 | 3 | 2 | 4 | 1 | 7 | 6 | 8 | 5 |

Accordingly, a conventional source device may arrange this example sequence of coded pictures according to their decoding order. Conventionally, pictures inside a GOP (in the example of Table 1, the GOP size is 4) with the same temporal hierarchical level may be separated from pictures in other GOPs of the same hierarchical level. For example, $B_2$ and $B_6$ are both temporal hierarchical level 1 pictures in the example of Table 1, but would be separated by pictures with different temporal levels if arranged in decoding order. Even pictures with the same temporal level within one GOP could be separated by pictures with different temporal levels. Assume a fragment that contains e.g., 10 GOPs, the pictures with a identical temporal level might be distributed in the fragment as multiple separate pieces.

The techniques of this disclosure, on the other hand, provide an ordering in terms of hierarchical layer of a sequence of coded pictures. As an example, a source device according to the techniques of this disclosure may arrange the example sequence above as shown in Table 2:

TABLE 2

| | Pictures in Display Order | | | | | | | | |
|---|---|---|---|---|---|---|---|---|---|
| | $I_0$ | $B_1$ | $B_2$ | $B_3$ | $P_4$ | $B_5$ | $B_6$ | $B_7$ | $P_8$ |
| Temporal hierarchical level | 0 | 2 | 1 | 2 | 0 | 2 | 1 | 2 | 0 |
| Decoding Order | 0 | 4 | 3 | 5 | 2 | 7 | 6 | 8 | 1 |
| Order in File | 0 | 5 | 3 | 6 | 1 | 7 | 4 | 8 | 2 |

In this manner, coded video pictures in a sequence may be arranged according to hierarchical level within a fragment of a video file. That is, pictures of a common hierarchical level within a fragment may grouped together contiguously within the fragment. Each sub-track fragment (corresponding to a particular hierarchical level) may be delivered to a device in response to a single request. In this manner, a destination device may issue a single request to retrieve pictures up to a particular hierarchical level. The byte range of each sub-track fragment may be transmitted to a destination device before any video pictures are requested, such that the destination device can form the request for one or more of the hierarchical levels.

For example, a destination device may be configured to retrieve pictures up to hierarchical level one, which may correspond to two sub-track fragments: 0 and 1. The destination device could issue a request based on the byte ranges of sub-track fragments 0 and 1. In response to this example request, a source device may provide the pictures in sub-track fragment 0 and 1, having display order 0, 8, 4, 2, 6, and so on.

By ordering the pictures according to hierarchical level, the source device may simplify the process by which the destination device may retrieve coded video pictures of a common hierarchical level. The destination device need not, for example, determine the locations of each of the pictures corresponding to a desired hierarchical level and individually issue multiple requests for such pictures, but instead may submit a single request to retrieve only pictures up to the desired hierarchical level.

Upon receiving the sub-track fragments, based on the signaling in the sub-track fragments, the destination device may reorder the received video pictures, up to a hierarchical level, to form a correct decoding order, before sending the video pictures to a video decoder. In addition, information describing the hierarchy of each sub-track fragment may be signaled, e.g., the temporal scalability, the frame rate, and the play rate, when used as fast forward.

A destination device may be configured to retrieve pictures only up to a particular hierarchical level for a variety of reasons. For example, a destination device may support a maximum frame rate that is lower than the maximum available frame rate of a video file. As another example, a destination device may support "trick modes," such as fast forward playback at rates two times, four times, eight times, or other multiples of the normal playback rate. In this manner, the techniques of this disclosure may support temporal scalability.

The techniques of this disclosure may be applied to video files conforming to any of ISO base media file format, Advanced Video Coding (AVC) file format, Third Generation Partnership Project (3GPP) file format, Scalable Video Coding (SVC) file format, and/or Multiview Video Coding (MVC) file format, or other similar video file formats. Moreover, the hierarchical level may be any hierarchical level in accordance with these or other video file formats. For example, with respect to SVC, the hierarchical levels may correspond to various layers of coding, e.g., a base layer and one or more enhancement layers. As another example, with respect to MVC, the hierarchical levels may correspond to various views.

The ISO Base Media File Format is designed to contain timed media information for a presentation in a flexible, extensible format that facilitates interchange, management, editing, and presentation of the media. ISO Base Media File format (ISO/IEC 14496-12:2004) is specified in MPEG-4 Part-12, which defines a general structure for time-based media files. It is used as the basis for other file formats in the family such as AVC file format (ISO/IEC 14496-15) defined support for H.264/MPEG-4 AVC video compression, 3GPP file format, SVC file format, and MVC file format. 3GPP file format and MVC file format are extensions of the AVC file format. ISO base media file format contains the timing, structure, and media information for timed sequences of media data, such as audio-visual presentations. The file structure may be object-oriented. A file can be decomposed into basic objects very simply and the structure of the objects is implied from their type.

In the examples of MPEG-1 and MPEG-2, B-encoded pictures provide a natural temporal scalability. A track of a video file conforming to MPEG-1 or MPEG-2 may include a full set of I-encoded pictures, P-encoded pictures, and B-encoded pictures. By dropping the B-encoded pictures, the video file may achieve a conforming half resolution video representation. MPEG-1 and MPEG-2 also provide a base layer and enhancement layer concept to code two temporal layers, wherein the enhancement layer pictures can choose, for each prediction direction, a picture either from the base layer or the enhancement layer as a reference. Accordingly, a destination device may request, and a source device may provide, fewer encoded pictures than the full set of I, P, and B encoded pictures included within a video file. The video data provided by the source device to the destination device may still conform to MPEG-1 and MPEG-2, and have a half (or lower) resolution than the original, full set of encoded pictures.

As another example, H.264/AVC uses hierarchical B-encoded pictures to support temporal scalability. The first picture of a video sequence in H.264/AVC may be referred to as an Instantaneous Decoder Refresh (IDR) picture, also known as a key picture. Key pictures are typically coded in regular or irregular intervals, which are either Intra-coded or Inter-coded using a previous key picture as reference for motion compensated prediction. A Group of Pictures (GOP) generally includes a key picture and all pictures which are temporally located between the key picture and a previous key picture. A GOP can be divided into two parts, one is the key picture, and the other includes non-key pictures. The non-key pictures are hierarchically predicted by 2 reference pictures, which are the nearest pictures of the lower temporal level from the past and the future.

A temporal identifier value may be assigned to each picture to indicate a hierarchical position of the picture, that is, a hierarchical layer to which the picture corresponds. Thus pictures with temporal identifier values up to N may form a video segment with twice the frame rate of that of a video segment formed by pictures with temporal identifier values up to N−1. Accordingly, the techniques of this disclosure may also be used to achieve temporal scalability in H.264/AVC by arranging coded video pictures into sub-track fragments, such that a destination device may request one or more of the sub-track fragments, but may request fewer than the full set of sub-track fragments of a movie fragment. That is, the destination device may request sub-track fragments having temporal identifiers less than or equal to N.

Files conforming to the ISO base media file format (and extensions thereof) may be formed as a series of objects, called "boxes." Data in the ISO base media file format is contained in boxes, such that no other data needs to be contained within the file outside the boxes. This includes any initial signature required by the specific file format. A "box" may be an object-oriented building block defined by a unique type identifier and length. Typically, a presentation is contained in one file, and the media presentation is self-contained. The movie container (movie box) may contain the metadata of the media and the video and audio frames may be contained in the media data container and could be in other files.

A presentation (motion sequence) may be contained in several files. Timing and framing (position and size) information is generally in the ISO base media file and the ancillary files may essentially use any format. This presentation may be 'local' to the system containing the presentation, or may be provided via a network or other stream delivery mechanism.

The files may have a logical structure, a time structure, and a physical structure, and these structures are not required to be coupled. The logical structure of the file may be of a movie that in turn contains a set of time-parallel tracks. The time structure of the file may be that the tracks contain sequences of pictures in time, and those sequences are mapped into the timeline of the overall movie by optional edit lists. The physical structure of the file may separate the data needed for logical, time, and structural de-composition, from the media data samples themselves. This structural information may be concentrated in a movie box, possibly extended in time by movie fragment boxes. The movie box may document the logical and timing relationships of the samples, and may also contain pointers to where they are located. Those pointers may be into the same file or another one, e.g., referenced by a URL.

Each media stream may be contained in a track specialized for that media type (audio, video etc.), and may further be parameterized by a sample entry. The sample entry may contain the 'name' of the exact media type (the type of decoder needed to decode the stream) and any parameterization of that decoder needed. The name may also take the form of a four-character code, e.g., "moov," or "trak." There are defined sample entry formats not only for MPEG-4 media, but also for the media types used by other organizations using this file format family.

Support for meta-data generally takes two forms. First, timed meta-data may be stored in an appropriate track, synchronized as desired with the media data it is describing. Secondly, there may be general support for non-timed meta-data attached to the movie or to an individual track. The structural support is general, and allows, as in the media-data, the storage of meta-data resources elsewhere in the file or in another file. In addition, these resources may be named, and may be protected.

In the ISO base media file format, a sample grouping is an assignment of each of the samples in a track to be a member of one sample group. Samples in a sample group are not required to be contiguous. For example, when presenting H.264/AVC in AVC file format, video samples in one temporal level can be sampled into one sample group. Sample groups may be represented by two data structures: a SampleToGroup box (sbdp) and a SampleGroupDescription box. The SampleToGroup box represents the assignment of samples to sample groups. There may be one instance of the SampleGroupDescription box for each sample group entry, to describe the properties of the corresponding group.

An optional metadata track can be used to tag each track with the "interesting characteristic" that it has, for which its value may differ from other members of the group (e.g., its bit rate, screen size, or language). Some samples within a track may have special characteristics or may be individually identified. One example of the characteristic is the synchronization point (often a video I-frame). These points may be identified by a special table in each track. More generally, the nature of dependencies between track samples can also be documented using metadata. The metadata can be structured as a sequence of file format samples, just like a video track. Such a track may be referred to as a metadata track. Each metadata sample may be structured as a metadata statement. There are various kinds of statement, corresponding to the various questions that might be asked about the corresponding file-format sample or its constituent samples.

When media is delivered over a streaming protocol, the media may need to be transformed from the way it is represented in the file. One example of this is when media is transmitted over the Real Time Protocol (RTP). In the file, for example, each frame of video is stored contiguously as a file-format sample. In RTP, packetization rules specific to the codec used, must be obeyed to place these frames in RTP packets. A streaming server may be configured to calculate such packetization at run-time. However, there is support for the assistance of the streaming servers. Special tracks called hint tracks may be placed in the files.

Hint tracks contain general instructions for streaming servers as to how to form packet streams from media tracks for a specific protocol. Because the form of these instructions is media-independent, servers may not need to be revised when new codecs are introduced. In addition, encoding and editing software can be unaware of streaming servers. Once editing is finished on a file, a piece of software called a hinter may be used to add hint tracks to the file, before placing it on a streaming server. As an example, there is a defined hint track format for RTP streams in the MP4 file format specification.

3GP (3GPP file format) is a multimedia container format defined by the Third Generation Partnership Project (3GPP) for 3G UMTS multimedia services. It is typically used on 3G mobile phones and other 3G capable devices, but can also be played on some 2G and 4G phones and devices. 3GPP file format is based on ISO base media file format. The latest 3GP is specified in 3GPP TS26.244, "Transparent end-to-end packet switched streaming service (PSS); 3GPP file format (3GP)." The 3GPP file format stores video streams as MPEG-4 Part 2 or H.263 or MPEG-4 Part 10 (AVC/H.264). 3GPP allows use of AMR and H.263 codecs in the ISO base media file format (MPEG-4 Part 12), because 3GPP specifies the usage of the Sample Entry and template fields in the ISO base media file format as well as defining new boxes to which codecs refer. For the storage of MPEG-4 media specific information in 3GP files, the 3GP specification refers to MP4 and the AVC file format, which are also based on the ISO base media file format. The MP4 and the AVC file format specifications describe usage of MPEG-4 content in the ISO base media file format.

The ISO base media file format specification defines an alternate group of tracks. An alternate group includes a subset of the total available tracks, and each track may correspond to one alternate group. In general, a destination device may select one track from each alternate group, to the exclusion of other tracks in the alternate groups. The 3GPP file format specification defines a switch group of tracks, which is similar to an alternate group. During download streaming and playback, the destination device may switch between different tracks of a switch group. That is, tracks in the same switch group are available for switching during a session, whereas tracks in different switch groups are typically not available for switching.

SVC file format, as an extension of AVC file format, provides structures of extractor and tier. Extractors are pointers that provide information about the position and the size of the video coding data in the sample with equal decoding time in another track. This allows building a track hierarchy directly in the coding domain. An extractor track in SVC is linked to one or more base tracks, from which it extracts data at run-time. An extractor is a dereferenceable pointer with a NAL unit header with SVC extensions. If the track used for extraction contains video coding data at a different frame rate, then the extractor also contains a decoding time offset to ensure synchrony between tracks. At run-time, the extractor has to be replaced by the data to which it points, before the stream is passed to the video decoder.

Because the extractor tracks in SVC are structured like video coding tracks, they may represent the subset they need in different ways. An SVC extractor track contains only instructions on how to extract the data from another track. In SVC file format, there are also aggregators, which can aggregate the NAL unit within a sample together as one NAL unit, including aggregating the NAL units in one layer into an aggregator. The extractor in SVC is designed to extract a certain range of bytes from a sample or an aggregator, or just one entire NAL unit, but not multiple NAL units, especially those that are not consecutive in a sample. In SVC file format, there could be many video operation points. Tiers are designed to group the samples in one or more tracks for an operation point.

MVC file format also supports an extractor track, which extracts the NAL units from different views to form an operation point, which is a subset of views in a certain frame rate. The design of the MVC extractor track is similar to the extractor in SVC file format. However, using the MVC extractor tracks to form an alternate group is not supported. To support track selection, the following MPEG proposal is proposed to MPEG: P. Frojdh, A. Norkin, and C. Priddle, "File format sub-track selection and switching," ISO/IEC JTC1/SC29/WG11MPEG M16665, London UK. This proposal tries to enable the alternate/switch group concept in a sub-track level.

A map sample group is an extension to the sample group. In Map sample group, each group entry (of samples) has its description of "groupID," which actually is a map to a view_id, after possibly aggregating NAL units in a view into one NAL unit. In other words, each sample group entry has its containing views listed in the ScalableNALUMapEntry value. The grouping_type of this sample group entry is "scnm."

The term "progressive download" is used to describe the transfer of digital media files from a server to a client, typically using the HTTP protocol. When initiated from a computer, the computer may begin playback of the media before the download is complete. One difference between streaming media and progressive download is in how the digital media data is received and stored by the end user device that is accessing the digital media. A media player that is capable of progressive download playback relies on metadata located in the header of the file to be intact and a local buffer of the digital media file as it is downloaded from a web server. At the point in which a specified amount of data becomes available to the local playback device, the device may begin to play the media. This specified amount of buffer may be embedded into the file by the producer of the content in the encoder settings and may be reinforced by additional buffer settings imposed by the media player of the client computer.

AVC and 3GPP are extensions of the ISO base media file format, while SVC and MVC are extensions of the AVC file format. Accordingly, the techniques of this disclosure may be applied with respect to video files conforming to the ISO base media file format, the AVC file format and extensions thereof, e.g., SVC and MVC, and/or the 3GPP file format. The techniques may further be applied to these and other extensions of these formats, and may further be applied to extend other file formats to provide sub track fragments with assembling of video samples in various file formats for HTTP streaming.

With respect to 3GPP as another example, HTTP/TCP/IP transport is supported for 3GPP files for download and progressive download. Furthermore, using HTTP for video streaming may provide some advantages, and the video streaming services based on HTTP are becoming popular. HTTP streaming may provide certain advantages, including that existing Internet components and protocols may be used, such that new efforts are not needed to develop new techniques for transporting video data over a network. Other transport protocols, e.g., RTP payload format, require intermediate network devices, e.g., middle boxes, to be aware of the media format and the signaling context. Also, HTTP streaming can be client-driven, which may avoid control issues.

For example, to exploit features to obtain optimal performance, the server may keep track of the size and content of packets which are not yet acknowledged. The server may also analyze the file structure and reconstruct the state of the client buffer to make RD-optimal switching/thinning decisions. In addition, constraints on the bit stream variations may be satisfied in order to stay compliant with negotiated profiles.

HTTP does not necessarily require new hardware or software implementations at a Web server that has HTTP 1.1 implemented. HTTP streaming also provides TCP-friendliness and firewall traversal.

In HTTP streaming, frequently used operations include GET and partial GET. The GET operation retrieves a whole file associated a given uniform resource locator (URL) or uniform resource name (URN). The partial GET operation receives a byte range as an input parameter and retrieves a continuous number of bytes of a file corresponding to the received byte range. Thus, movie fragments may be provided for HTTP streaming, because a partial GET operation can get one or more individual movie fragments. Note that, in a movie fragment, there can be several track fragments of different tracks. In HTTP streaming, a media presentation may be a structured collection of data that is accessible to the client. The client may request and download media data information to present a streaming service to a user.

FIG. 1 is a block diagram illustrating an example system 10 in which audio/video (A/V) source device 20 sends audio and video data to A/V destination device 40. System 10 of FIG. 1 may correspond to a video teleconference system, a server/client system, a broadcaster/receiver system, or any other system in which video data is sent from a source device, such as A/V source device 20, to a destination device, such as A/V destination device 40. In some examples, A/V source device 20 and A/V destination device 40 may perform bidirectional information exchange. That is, A/V source device 20 and A/V destination device 40 may be capable of both encoding and decoding (and transmitting and receiving) audio and video data. In some examples, audio encoder 26 may comprise a voice encoder, also referred to as a vocoder.

A/V source device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit, or any other source of video data.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. A/V source device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

The techniques of this disclosure are generally directed to the storage and transport of encoded multimedia (e.g., audio and video) data, and reception and subsequent interpretation and decoding of the transported multimedia data. As shown in the example of FIG. 1, video source 24 may provide a plurality of views of a scene to video encoder 28.

A/V source device 20 may provide a "service" to A/V destination device 40. A service generally corresponds to a subset of available views of MVC data. For example, MVC data may be available for eight views, ordered zero through seven. One service may correspond to stereo video having two views, while another service may correspond to four views, and still another service may correspond to all eight views. In general, a service corresponds to any combination (that is, any subset) of the available views. A service may also correspond to a combination of available views as well as audio data. An operation point may correspond to a service, such that A/V source device 20 may further provide an operation point descriptor for each service provided by A/V source device 20.

Each individual stream of data (whether audio or video) is referred to as an elementary stream. An elementary stream is a single, digitally coded (possibly compressed) component of a program. For example, the coded video or audio part of the program can be an elementary stream. An elementary stream may be converted into a packetized elementary stream (PES) before being encapsulated within a video file. Within the same program, a stream ID is used to distinguish the PES-packets belonging to one elementary stream from the other. The basic unit of data of an elementary stream is a packetized elementary stream (PES) packet. Thus, each view of MVC video data corresponds to respective elementary streams. Similarly, audio data corresponds to one or more respective elementary streams.

An MVC coded video sequence may be separated into several sub-bitstreams, each of which is an elementary stream. Each sub-bitstream may be identified using an MVC view_id subset. Based on the concept of each MVC view_id subset, an MVC video sub-bitstream is defined. An MVC video sub-bitstream contains the NAL units of the views listed in the MVC view_id subset. A program stream generally contains only the NAL units which are from those of the elementary streams. It is also designed that any two elementary streams cannot contain an identical view, but may instead contain views, e.g., different perspectives of a scene for creating a three-dimensional effect.

In the example of FIG. 1, encapsulation unit 30 receives elementary streams comprising video data from video encoder 28 and elementary streams comprising audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

A "program," as used in this disclosure, may comprise a combination of audio data and video data, e.g., an audio elementary stream and a subset of available views delivered by a service of A/V source device 20. Each PES packet includes a stream_id that identifies the elementary stream to which the PES packet belongs. Encapsulation unit 30 is responsible for assembling elementary streams into a video file.

Encapsulation unit 30 receives PES packets for elementary streams of a program from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need of redundant transmissions for error resilience. In out-of-band transmission examples, parameter set NAL units may be transmitted on a different channel than other NAL units, such as SEI NAL units.

In accordance with the techniques of this disclosure, encapsulation unit 30 may assemble video samples into sub-track fragments, each of which may correspond to a particular hierarchical layer, e.g., temporal layer. Encapsulation unit 30 may also present each sub-track fragment in a video file as a set of consecutive bytes. In some examples, a sub track fragment may contain only normal, encoded samples. In some examples, a sub-track fragment may contain normal samples as well as reassembler samples pointing to samples in one or more preceding sub-track fragments in the current movie fragment. Furthermore, in some examples, a sub-track fragment may contain only reassembler samples.

In general, samples of sub-track fragments of a higher layer may be encoded with reference to samples of sub-track fragments of a lower layer. Encapsulation unit 30 may ensure that samples of sub-track fragments of a lower layer do not depend on samples of a higher layer, such that destination device 40 may retrieve samples up to a desired layer without requiring retrieval of higher layers than the desired layer. In this manner, destination device 40 may submit an HTTP partial GET request once to retrieve one or more sub-track fragments. For example, destination device 40 may submit one request for each desired layer. When the layers are arranged contiguously within the file, destination device 40 may submit a request to retrieve data for multiple layers.

In some examples, encapsulation unit 30 may signal reordering information in a video file that indicates how to reorder the coded video pictures of more than one sub-track fragment into decoding order. For example, as described above, encapsulation unit 30 may include reassembler objects in a sub-track fragment. In general, a reassembler object may act as a pointer to a coded video sample in a previous e.g., within the same or a lower level sub-track fragment. Destination device 40 may use reassembler objects to re-arrange samples after sub-track fragments have been received. For example, after using one or more requests to retrieve sub-track fragments of a video file, decapsulation unit 38 of destination device 40 may use the reassembler objects to assemble the coded video samples in decoding order before video decoder 48 decodes the samples. Decapsulation unit 38 may use a latest sub-track fragment in byte order as a starting point to multiplex samples by referring to samples in previous sub-track fragments. A reassembler object may include a position of a referenced sample and an index of the sub-track fragment including the sample referenced by the reassembler object.

In addition, when encapsulation unit 30 includes reassembler objects in sub-track fragments, encapsulation unit 30 may further include de-multiplexing headers (which may alternatively be referred to as "reassembling headers") that describe characteristics of one or more sub-track fragments. Encapsulation unit 30 may include the de-multiplexing headers in various locations, such as, for example, a movie box, a movie fragment header, and/or a track fragment header. The de-multiplexing headers may specify unique identifiers for each sub-track fragment, byte ranges for corresponding sub-track fragments, a number of pictures in each sub-track fragment, and timing information of the sub-track fragments. The timing information may be described as relative timing information in terms of samples or coordinated universal times (UTC). Encapsulation unit 30 need not include such timing information when sub-track fragments do not correspond to layers with different frame rates or temporal levels.

In some examples, e.g., with respect to SVC and MVC, multiple layers of coded video samples may be included within a common track. For example, multiple encoding layers (e.g., in SVC) and multiple views (e.g., in MVC) may be included within a track of a video file. Encapsulation unit 30 may separate related hierarchical layers into respective sub-track fragments. Each sub-track fragment may correspond to a common layer, such as a dimension, a temporal layer, a signal-to-noise ratio layer, a spatial layer, or a view. As noted, data for each sub-track fragment may be included in a video file as consecutive bytes of data.

Encapsulation unit 30 may further define operation points as including particular sub-track fragments. In particular, encapsulation unit 30 may define characteristics of operation points, including a temporal level (temporal_id), quality_id, dependency_id, and/or view_id. In examples corresponding to SVC, the characteristics may correspond to the values in the NAL unit header of the SVC NAL units. In examples corresponding to MVC, the characteristics may correspond to the values in the NAL unit header of the MVC NAL units. In some examples, only the temporal level may be present as a characteristic of an operation point. In the context of SVC, temporal_id (temporal level), quality_id, and dependency_id can be present. In the context of MVC, temporal_id and view_id can be present.

In some examples, the characteristics of the operation points may further include a map of the above characteristics to an index of a sub-track fragment. Furthermore, operation point characteristics may include codec information, a profile indicator (profile_idc), a level indicator (level_idc), a frame rate for the operation point, an average bitrate for the operation point, a maximum bitrate for the operation point, a spatial resolution for the operation point, a number of views to output for the operation point, and/or a number of views to be decoded for the operation point. These characteristics may be merged into existing operation points as defined by the respective file format.

Encapsulation unit 30 may form NAL units comprising a header that identifies a program to which the NAL belongs, as well as a payload, e.g., audio data, video data, or data that describes the transport or program stream to which the NAL unit corresponds. For example, in H.264/AVC, a NAL unit includes a 1-byte header and a payload of varying size. In one example, a NAL unit header comprises a priority_id element, a temporal_id element, an anchor_pic_flag element, a view_id element, a non_idr_flag element, and an inter_view_flag element. In conventional MVC, the NAL unit defined by H.264 is retained, except for prefix NAL units and MVC coded slice NAL units, which include a 4-byte MVC NAL unit header and the NAL unit payload.

The priority_id element of an NAL header may be used for a simple one-path bitstream adaptation process. The temporal_id element may be used for specifying the temporal level of the corresponding NAL unit, where different temporal levels correspond to different frame rates.

The anchor_pic_flag element may indicate whether a picture is an anchor picture or non-anchor picture. Anchor pictures and all the pictures succeeding it in the output order (that is, the display order) can be correctly decoded without decoding of previous pictures in the decoding order (that is, the bitstream order), and thus, can be used as random access points. Anchor pictures and non-anchor pictures can have different dependencies, both of which are signaled in the sequence parameter set. Other flags are to be discussed and used in the following sections of this chapter. Such an anchor picture may also be referred to as an open GOP (Group Of Pictures) access point, while a close GOP access point is also supported when the non_idr_flag element is equal to zero. The non_idr_flag element indicates whether a picture is an instantaneous decoder refresh (IDR) or view IDR (V-IDR) picture. In general, an IDR picture, and all the pictures succeeding it in output order or bitstream order, can be correctly decoded without decoding of previous pictures in either decoding order or display order.

The view_id element may comprise syntax information that may be used to identify a view, which may be used for data interactivity inside an MVC decoder, e.g., for inter-view prediction, and outside a decoder, e.g., for rendering. The inter_view_flag element may specify whether the corresponding NAL unit is used by other views for inter-view prediction. To convey the 4-byte NAL unit header information for a base view, which may be compliant to AVC, a prefix NAL unit is defined in MVC. In the context of MVC, the base view access unit includes the VCL NAL units of the current time instance of the view as well as its prefix NAL unit, which contains only the NAL unit head. An H.264/AVC decoder may ignore the prefix NAL unit.

A NAL unit including video data in its payload may comprise various granularity levels of video data. For example, a NAL unit may comprise a block of video data, a macroblock, a plurality of macroblocks, a slice of video data, or an entire frame of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 second. During this time interval, the specific frames for all views of the same access unit (the same time instance) may be rendered simultaneously. In an example corresponding to H.264/AVC, an access unit may comprise a coded picture in one time instance, which may be presented as a primary coded picture. Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

H.264/AVC defines the syntax, semantics, and decoding process for error-free bitstreams, any of which conform to a certain profile or level. H.264/AVC does not specify the encoder, but the encoder is tasked with guaranteeing that the generated bitstreams are standard-compliant for a decoder. In the context of video coding standard, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and macroblock (MB) processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define, for example, limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

Video compression standards such as ITU-T H.261, H.262, H.263, MPEG-1, MPEG-2 and H.264/MPEG-4 part 10 make use of motion compensated temporal prediction to reduce temporal redundancy. The encoder uses a motion compensated prediction from some previously encoded pictures (also referred to herein as frames) to predict the current coded pictures according to motion vectors. There are three major picture types in typical video coding. They are Intra coded picture ("I-pictures" or "I-frames"), Predicted pictures ("P-pictures" or "P-frames") and Bi-directional predicted pictures ("B-pictures" or "B-frames"). P-pictures use only the reference picture before the current picture in temporal order. In a B-picture, each block of the B-picture may be predicted from one or two reference pictures. These reference pictures could be located before or after the current picture in temporal order.

In accordance with the H.264 coding standard, as an example, B-pictures use two lists of previously-coded reference pictures, list 0 and list 1. These two lists can each contain past and/or future coded pictures in temporal order. Blocks in a B-picture may be predicted in one of several ways: motion-compensated prediction from a list 0 reference picture, motion-compensated prediction from a list 1 reference picture, or motion-compensated prediction from the combination of both list 0 and list 1 reference pictures. To get the combination of both list 0 and list 1 reference pictures, two motion compensated reference areas are obtained from list 0 and list 1 reference picture respectively. Their combination will be used to predict the current block.

The ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Blocks may have different numbers of pixels in the horizontal and vertical dimensions. That is, blocks may include N×M pixels, where N is not necessarily equal to M.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence, or another independently decodable unit defined according to applicable coding techniques.

The term macroblock refers to a data structure for encoding picture and/or video data according to a two-dimensional pixel array that comprises 16×16 pixels. Each pixel comprises a chrominance component and a luminance component. Accordingly, the macroblock may define four luminance blocks, each comprising a two-dimensional array of 8×8 pixels, two chrominance blocks, each comprising a two-dimensional array of 16×16 pixels, and a header comprising syntax information, such as a coded block pattern (CBP), an encoding mode (e.g., intra-(I), or inter-(P or B) encoding modes), a partition size for partitions of an intra-encoded block (e.g., 16×16, 16×8, 8×16, 8×8, 8×4, 4×8, or 4×4), or one or more motion vectors for an inter-encoded macroblock.

Video encoder 28, video decoder 48, audio encoder 26, audio decoder 46, encapsulation unit 30, and decapsulation unit 38 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder audio encoder 26, audio decoder 46, encapsulation unit 30, and/or decapsulation unit 38 may comprise an integrated circuit, a microprocessor, and/or a wireless communication device, such as a cellular telephone.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to destination device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium 34, such as, for example, a transmission signal, a magnetic medium, an optical medium, a memory, a flash drive, or other computer-readable medium.

Ultimately, input interface 36 retrieves the data from computer-readable medium 34. Input interface 36 may comprise, for example, an optical drive, a magnetic media drive, a USB port, a receiver, a transceiver, or other computer-readable medium interface. Input interface 36 may provide the NAL unit or access unit to decapsulation unit 38. Decapsulation unit 38 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Decapsulation unit 38 may interact with input interface 36 to initially request header data for a video file, where the header data may describe characteristics of the video file. For example, the header data may describe characteristics of sub-track fragments included in track fragments of movie fragments within the video file. The header data may describe, for example, byte ranges of individual sub-track fragments of a movie fragment. The header data may also describe other characteristics that may assist decapsulation unit 38 in selecting a subset of available sub-track fragments of the video file. After selecting a particular set of available sub-track fragments, decapsulation unit 38 may submit one or more requests for the selected sub-track fragments of each movie fragment of the video file.

For example, decapsulation unit 38 may select a particular operation point, which may correspond to a subset of available hierarchical layers. Decapsulation unit 38 may then determine, for each movie fragment, which sub-track fragments of the movie fragment correspond to the hierarchical layers of the operation point. Moreover, decapsulation unit 38 may determine byte ranges within each movie fragments for the respective sub-track fragments. Based on these determined byte ranges, decapsulation unit 38 may generate HTTP partial Get requests that specify the determined byte ranges for the movie fragments to retrieve the sub-track fragments. In some examples, decapsulation unit 38 may generate individual requests for each desired layer. In some examples, decapsulation unit 38 may generate a single request for sub-track fragments spanning multiple layers. Decapsulation unit 38 may then rearrange coded video samples of the sub-track fragments in decoding order using reassembler objects of the sub-track fragments and pass the arranged coded video samples to video decoder 48, which may decode the video samples. Ultimately, video output 44 may display the decoded video samples.

Figure 2:
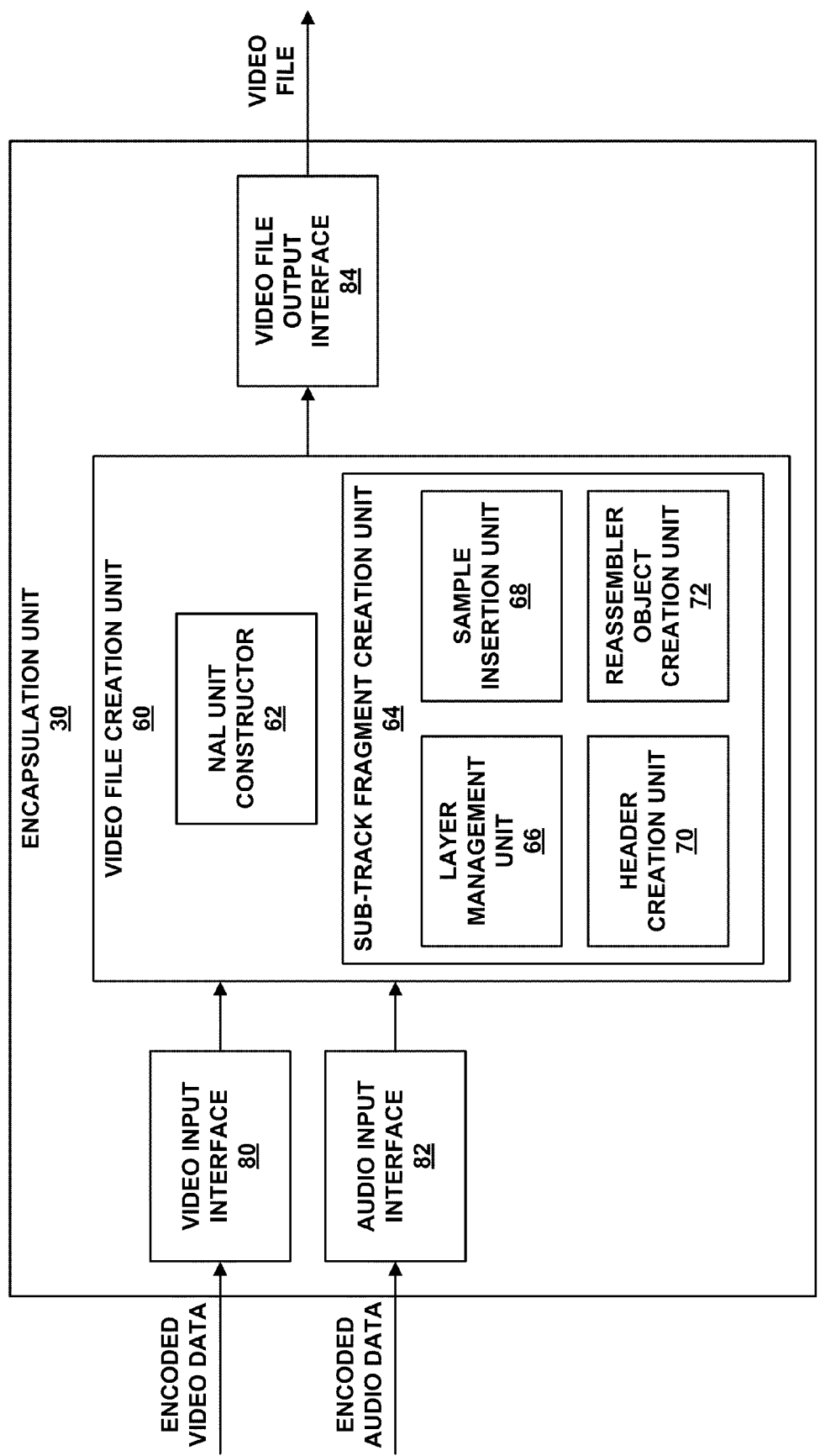
FIG. 2 is a block diagram illustrating components of an example encapsulation unit.

FIG. 2 is a block diagram illustrating components of an example encapsulation unit 30. In the example of FIG. 2, encapsulation unit 30 includes video input interface 80, audio input interface 82, video file creation unit 60, and video file output interface 84. Video file creation unit 60, in this example, includes network abstraction layer (NAL) unit constructor 62 and sub-track fragment creation unit 64, which further includes layer management unit 66, sample insertion unit 68, header creation unit 70, and reassembler object creation unit 72.

Video input interface 80 and audio input interface 82 receive encoded video and audio data, respectively. Video input interface 80 and audio input interface 82 may receive encoded video and audio data as the data is encoded, or may retrieve encoded video and audio data from a computer-readable medium. Upon receiving encoded video and audio data, video input interface 80 and audio input interface 82 pass the encoded video and audio data to video file creation unit 60 for assembly into a video file.

Video file creation unit 60 may correspond to a control unit including hardware, software, and/or firmware configured to perform the functions and procedures attributed thereto. Each of the sub-units of video file creation unit 60 (NAL unit constructor 62, sub-track fragment creation unit 64, layer management unit 66, sample insertion unit 68, header creation unit 70, and reassembler object creation unit 72, in this example) may be implemented as individual hardware units and/or software modules, and/or may be functionally integrated or further separated into additional sub-units.

Video file creation unit 60 may correspond to any suitable processing unit or processing circuitry, such as, for example, one or more microprocessors, application-specific integrated circuits (ASICs), field programmable gate arrays (FPGAs), digital signal processors (DSPs), or any combination thereof. Video file creation unit 60 may further include a computer-readable medium comprising instructions for any or all of NAL unit constructor 62, sub-track fragment creation unit 64, layer management unit 66, sample insertion unit 68, header creation unit 70, and reassembler object creation unit 72, as well as a processor for executing the instructions.

In general, video file creation unit 60 may create a video file including the received audio and video data. NAL unit constructor 62 may form NAL units including encoded video and audio samples. Video file creation unit 60 may further be configured to assemble movie fragments including coded video samples arranged in hierarchical level order. That is, video file creation unit 60 may be configured to organize coded video samples of a movie fragment such that coded video samples of a common hierarchical level of the movie fragment are stored contiguously within the movie fragment.

Layer management unit 66 may discern various hierarchical layers of data for a video file. Layer management unit 66 may further determine correspondence between sub-track fragments and hierarchical layers, e.g., based upon a file format standard to which a video file corresponds. For example, with respect to H.264/AVC, layer management unit 66 may associate temporal coding layers with sub-track fragments. As another example, with respect to SVC, layer management unit 66 may associate spatial layers (e.g., base layer and one or more enhancement layers) with sub-track fragments. As another example, with respect to MVC, layer management unit 66 may associate different views with sub-track fragments.

After determining an association between hierarchical layers and sub-track fragments, sample insertion unit 68 may insert coded video samples into appropriate sub-track fragments during creation of the video file. That is, sample insertion unit 68 may receive a coded video sample, determine a hierarchical layer to which the sample corresponds, determine a sub-track fragment of a movie fragment corresponding to the hierarchical layer, and insert the sample into the determined sub-track fragment. This arrangement may permit data from a common hierarchical layer to be retrieved using a single request, e.g., a single HTTP partial Get request specifying the byte range of the sub-track fragment corresponding to the hierarchical layer.

Header creation unit 70 may create headers for movie fragments and/or track fragments. In some examples, header creation unit 70 may store header data in a movie box that describes a number of movie fragments of a created video file. In general, header data created by header creation unit 70 may describe characteristics of sub-track fragments such as, for example, byte ranges for the sub-track fragments, and/or a number of samples in a sub-track fragment. In some examples, e.g., those for which the hierarchical layers comprise temporal coding layers, header creation unit 70 may specify timing information for each sub-track fragment.

Multiplexer object creation unit 72 may create and insert reassembler objects into sub-track fragments. A reassembler object may act as a pointer to identify a sample of another sub-track fragment that can be inserted at the position of the reassembler object in the sub-track fragment including the reassembler object. For example, in AVC and SVC, reassembler objects may simplify the task of rearranging an ordering of coded video samples at relatively higher layers (that is, layers including a relatively larger number of samples). Reassembler object creation unit 72 may create reassembler objects that include an index (or other identifier) of a sub-track fragment including the referenced sample, as well as position of the referenced sample within the sub-track fragment. The position may be expressed relative to the position of the reassembler in the current sub-track fragment.

Accordingly, video file creation unit 60 may produce various types of video files including sub-track fragments, in accordance with the techniques of this disclosure. After video file creation unit 60 produces a video file including movie fragments having coded video samples grouped according to their respective hierarchical levels, video file creation unit 60 may pass the video file to video file output interface 84. Video file output interface 84 may output the video file, e.g., to output interface 32 of source device 20. In some examples, video file output interface 84 may output the video file to a storage medium of source device 20 (not shown). The video file may be stored locally within source device 20, stored to a portable storage medium such as a DVD, Blu-ray disc, flash drive, floppy disk, or other portable storage medium, output via a network, e.g., according to a streaming protocol such as HTTP streaming, or otherwise output in such a way that the video file may be received by a client device, such as destination device 40.

Figure 3:
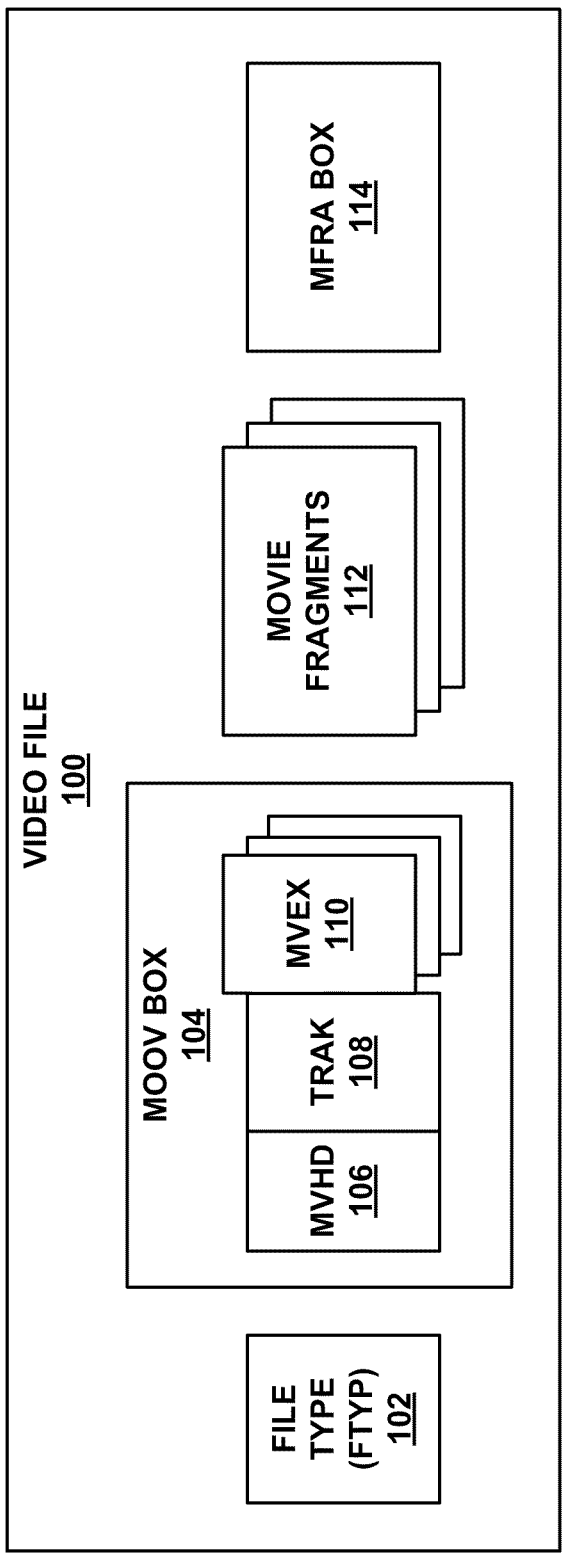
FIG. 3 is a block diagram illustrating elements of an example video file having video fragments, each including sub-track fragments having coded video pictures of a common hierarchical level.

FIG. 3 is a block diagram illustrating elements of an example video file 100 having video fragments 112, each including sub-track fragments having coded video pictures of a common hierarchical level. As described above, video files in accordance with the ISO base media file format and extensions thereof store data in a series of objects, referred to as "boxes." In the example of FIG. 3, video file 100 includes file type (FTYP) box 102, movie (MOOV) box 104, movie fragment (MOOF) boxes 112, and movie fragment random access (MFRA) box 114.

File type box 102 generally describes a file type for video file 100. File type box 102 may include data that identifies a specification that describes a best use for video file 100. File type box 102 may be placed before MOOV box 104, movie fragment boxes 112, and MFRA box 114.

MOOV box 104, in the example of FIG. 3, includes movie header (MVHD) box 106, track (TRAK) box 108, and one or more movie extends (MVEX) boxes 110. In general, MVHD box 106 may describe general characteristics of video file 100. For example, MVHD box 106 may include data that describes when video file 100 was originally created, when video file 100 was last modified, a timescale for video file 100, a duration of playback for video file 100, or other data that generally describes video file 100.

In some examples, encapsulation unit 30 may define the characteristics of sub-track fragments that correspond to operation points within MOOV box 104, or an initialisation segment for HTTP streaming. In some examples, encapsulation unit 30 may generate a sub-track fragment header box, which may be included as header data for video file 100, one of movie fragments 112 including the sub-track fragment, or in other locations. The sub-track fragment definition may include a data structure that maps each sub-track fragment of the operation point to descriptive characteristics for the sub-track fragment, such as, for example, a temporal level value, a quality_id value, a dependency_id value, and/or a view_id value. The operation point definition may further include descriptive information such as, for example, CODEC information, profile and level information, a frame rate for the operation point, an average bitrate for the operation point, a maximum bitrate for the operation point, a spatial resolution for the operation point, a number of views to be displayed for the operation point, and/or a number of views to be decoded for the operation point. Operation point definitions of a relevant standard may be modified to include such data.

TRAK box 108 may include data for a track of video file 100. TRAK box 108 may include a track header (TKHD) box that describes characteristics of the track corresponding to TRAK box 108. In some examples, TRAK box 108 may include coded video samples, while in other examples, the coded video samples of the track may be included in movie fragments 112, which may be referenced by data of TRAK box 108.

In some examples, video file 100 may include more than one track. Accordingly, MOOV box 104 may include a number of TRAK boxes equal to the number of tracks in video file 100. TRAK box 108 may describe characteristics of a corresponding track of video file 100. For example, TRAK box 108 may describe temporal and/or spatial information for the corresponding track. A TRAK box similar to TRAK box 108 of MOOV box 104 may describe characteristics of a parameter set track, when encapsulation unit 30 (FIG. 1) includes a parameter set track in a video file, such as video file 100.

MVEX boxes 110 may describe characteristics of corresponding movie fragments 112, e.g., to signal that video file 100 includes movie fragments 112, in addition to video data included within MOOV box 104, if any. In the context of streaming video data, coded video samples may be included in movie fragments 112 rather than in MOOV box 104. Accordingly, all coded video samples may be included in movie fragments 112, rather than in MOOV box 104.

MOOV box 104 may include a number of MVEX boxes 110 equal to the number of movie fragments 112 in video file 100. Each of MVEX boxes 110 may describe characteristics of a corresponding one of movie fragments 112. For example, each MVEX box may include a movie extends header box (MEHD) box that describes a temporal duration for the corresponding one of movie fragments 112.

Movie fragments 112 may include one or more coded video samples. In some examples, movie fragments 112 may include one or more groups of pictures (GOPs), each of which may include a number of coded video samples, e.g., frames or pictures. In addition, as described above, movie fragments 112 may include sequence data sets in some examples. Each of movie fragments 112 may include a movie fragment header box (MFHD). The MVHD box may describe characteristics of the corresponding movie fragment, such as a sequence number for the movie fragment. Movie fragments 112 may be included in order of sequence number in video file 100.

As noted above, encapsulation unit 30 may organize coded video samples of each of movie fragments 112 in order of the hierarchical levels of the coded video samples. That is, within each of movie fragments 112, encapsulation unit 30 may organize the coded video samples of the movie fragment such that coded video samples of a common hierarchical level are stored contiguously within the movie fragment. In this manner, destination device 40 (FIG. 1) may retrieve all coded video samples up to a particular hierarchical layer from one of movie fragments 112 by submitting a single request, e.g., an HTTP partial GET that specifies the byte range including the desired range of hierarchical levels. Similarly, destination device 40 may retrieve coded video samples of a common hierarchical layer using a single request, and may submit one request for each desired hierarchical layer.

MOOV box 104 and/or movie fragments 112 may include header data that describes sub-track fragments of movie fragments 112, such as, for example, byte ranges of movie fragments 112 including particular sub-track fragments. In this manner, destination device 40 may retrieve MOOV box 104 and/or headers of movie fragments 112 to determine which portion(s) of movie fragments 112 to request, based on desired sub-track fragments.

MFRA box 114 may describe random access points within movie fragments 112 of video file 100. This may assist with performing seeks to particular temporal locations within video file 100. MFRA box 114 is generally optional and need not be included in video files. Likewise, a client device, such as destination device 40, does not necessarily need to reference MFRA box 114 to correctly decode and display video data of video file 100. MFRA box 114 may include a number of track fragment random access (TFRA) boxes equal to the number of tracks of video file 100, or in some examples, equal to the number of media tracks (e.g., non-hint tracks) of video file 100.

FIG. 4A is a block diagram illustrating an example movie fragment 180A. Movie fragment 180A may correspond to one of movie fragments 112 (FIG. 3). In the example of FIG. 4A, movie fragment 180A includes various sub-track fragments. In particular, in this example, movie fragment 180A includes layer 0 sub-track fragment 182, layer 1 sub-track fragment 188, and layer 2 sub-track fragment 192.

Layer 0 sub-track fragment 182 may include coded video samples having a temporal coding hierarchy layer of zero. In this example, this layer includes I-frame 184 and P-frames 186A-186N (P-frames 186). P-frames 186 may be encoded relative to previous p-frames 186 and/or I-frame 184. For example, macroblocks of P-frame 186A may be encoded relative to I-frame 184, while macroblocks of P-frame 186B may be encoded relative to I-frame 184 or P-frame 186A.

Layer 1 sub-track fragment 188, in this example, includes B-frames 190A-190N (B-frames 190). Each of B-frames 190 have a temporal coding hierarchy of layer 1. Accordingly, B-frames 190 may be encoded relative to one or more frames of layer 0 sub-track fragment 182, that is, I-frame 184 and/or P-frames 186.

Layer 2 sub-track fragment 192, in this example, includes B-frames 194A-194N (B-frames 194). Each of B-frames 194 have a temporal coding hierarchy of layer 2. Accordingly, B-frames 194 may be encoded relative to one or more frames of layer 1 sub-track fragment 188, that is, B-frames 190. In addition, video fragment 180 may include additional sub-track fragments corresponding to higher temporal coding layers, as indicated by the ellipses following layer 2 sub-track fragment 192.

Although the cardinality of P-frames 186, B-frames 190, and B-frames 194 are each expressed with the variable "N," it should be understood that N is variable in each instance. That is, the number of P-frames 186 is not necessarily equal to the number of B-frames 190, which is further not necessarily equal to the number of B-frames 194.

Destination device 40 may determine to retrieve sub-track fragments up to a particular hierarchical layer. Accordingly, destination device 40 may submit one or more requests to retrieve sub-track fragments corresponding to hierarchical layers less than and/or equal to the determined layer. For example, assuming that destination device 40 determined to retrieve sub-track fragments up to layer one, destination device 40 may submit HTTP partial Get requests to retrieve layer 0 sub-track fragment 182 and layer 1 sub-track fragment 188. In some examples, destination device 40 may submit at most two HTTP partial Get requests to retrieve layer 0 sub-track fragment 182 and layer 1 sub-track fragment 188. In the example of FIG. 4A, destination device 40 may alternatively submit a single HTTP partial Get request to retrieve both layer 0 sub-track fragment 182 and layer 1 sub-track fragment 188, as layer 0 sub-track fragment 182 and layer 1 sub-track fragment 188 are arranged continuously within video fragment 180, in this example.

FIG. 4B is a block diagram illustrating an example movie fragment 180B. Movie fragment 180B is similar to movie fragment of 180A of FIG. 4A, except that in the example of FIG. 4B, higher layer sub-track fragments may include reassembler objects. For example, layer 1 sub-track fragment 196, in this example, includes reassembler objects 198A, 198B, and 198C. Reassembler object 198A identifies I-frame 184 of layer 0 sub-track fragment 182, reassembler object 198B identifies P-frame 186A of layer 0 sub-track fragment 182, and reassembler object 198C identifies P-frame 186B of layer 0 sub-track fragment 182, in this example. Higher layer sub-track fragments may include reassemblers that identify frames of layer 0 sub-track fragment 182 and reassemblers that identify B-frames 199 of layer 1 sub-track fragment 196.

Destination device 40 may use reassemblers 198 to assist in reordering frames in a decoding order. For example, decapsulation unit 38 may reorder the frames of layer 0 sub-track fragment 182 and layer 1 sub-track fragment 196 to produce a set of frames in a decoding order of I-frame 184, P-frame 186A, B-frame 199A, P-frame 186B, B-frame 199B, etc. Decapsulation unit 38 may then forward the frames in decoding order to video decoder 48. Video decoder 48 may then decode the frames, and video display 44 may ultimately display the frames in display order, which may be different from the decoding order and the order of the frames as arranged within video fragment 180B.

Figure 5:
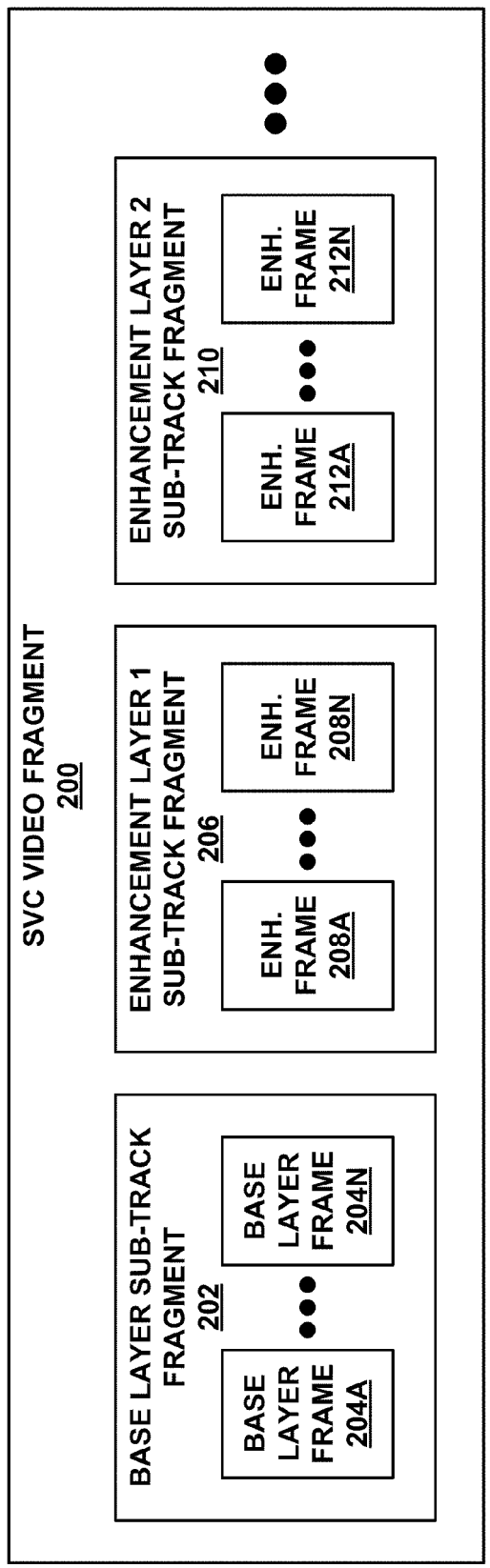
FIG. 5 is a block diagram illustrating an example SVC video fragment including video pictures organized according to hierarchical layers.

FIG. 5 is a block diagram illustrating an example SVC video fragment 200. In this example, SVC video fragment 200 includes base layer sub-track fragment 202, enhancement layer 1 sub-track fragment 206, and enhancement layer 2 sub-track fragment 210. Base layer sub-track fragment 202 includes base layer frames 204A-204N (base layer frames 204). Enhancement layer 1 sub-track fragment 206 includes enhancement frames 208A-208N (enhancement frames 208). Enhancement layer 2 sub-track fragment 210 includes enhancement frames 212A-212N (enhancement frames 212). Again, N should be understood as being potentially different for any of base layer frames 204, enhancement frames 208, and enhancement frames 212.

Base layer frames 204 may correspond to quarter common intermediate format (QCIF) frames. Enhancement frames 208 may correspond to CIF spatial enhancement layer frames. Enhancement frames 212 may correspond to further spatial enhancement layer frames.

In this manner, the techniques of this disclosure may be applied in the context of SVC. In addition, enhancement layers in SVC may also include reassembler objects that reference frames of the base layer and/or lower enhancement layers. Accordingly, destination device 40 may select a maximum desired layer and submit one or more requests (e.g., HTTP partial Get requests) to retrieve data for layers up to the selected layer.

Figure 6:
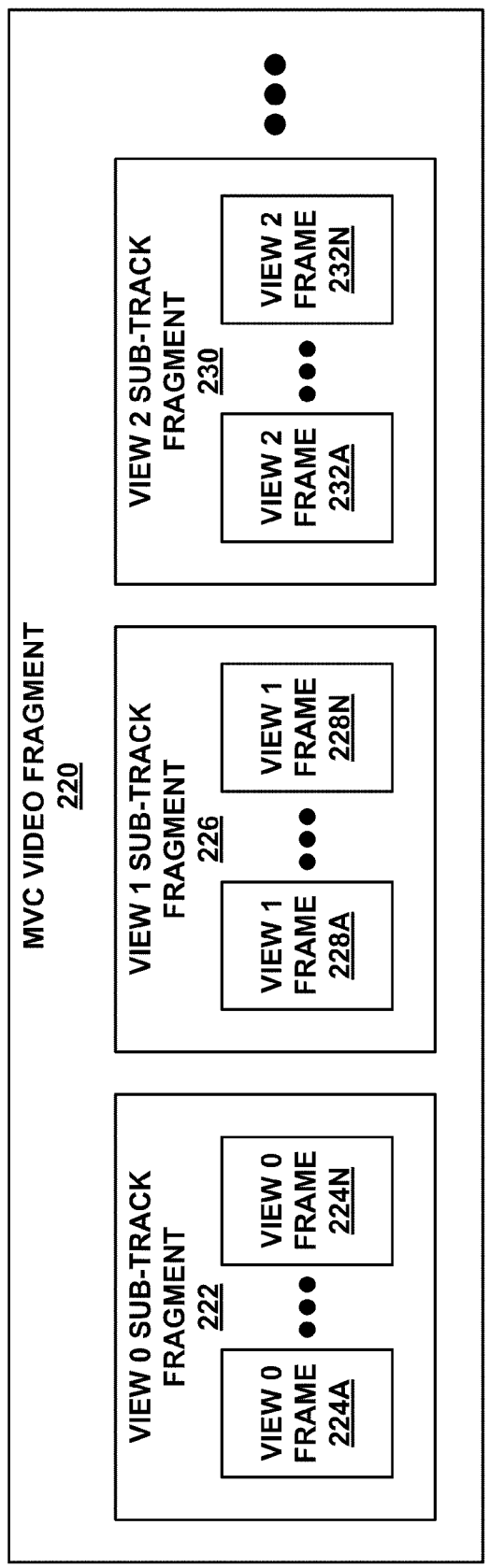
FIG. 6 is a block diagram illustrating an example MVC video fragment including video pictures organized according to hierarchical layers.

FIG. 6 is a block diagram illustrating an example MVC video fragment 220. In this example, MVC video fragment 220 includes view 0 sub-track fragment 222, view 1 sub-track fragment 226, and view 2 sub-track fragment 230. Each view may include a number of view components. For example, view 0 sub-track fragment 222 includes view 0 frames 224A-224N (view 0 frames 224), view 1 sub-track fragment 226 includes view 1 frames 228A-228N (view 1 frames 228), and view 2 sub-track fragment 230 includes view 2 frames 232A-232N (view 2 frames 232).

In the context of MVC, view components of each view may be arranged into different sub-track fragments, as illustrated in FIG. 6. In addition, as described above, view sub-track fragments may include reassemblers that point to view components of preceding sub-track fragments, which may contain coded video samples of view components.

Destination device 40 may retrieve view components of a particular view by issuing an HTTP partial Get request that specifies a byte range for a view sub-track fragment corresponding to the view. For example, to retrieve view components of view 0, destination device 40 may submit an HTTP partial Get request specifying the byte range of view 0 sub-track fragment 222 in MVC video fragment 220. Similarly, destination device 40 may issue individual requests to retrieve any or all of the other views of MVC video fragment 220. Upon receiving the requested views, destination device 40 may order the view components in a decoding order, decode the view components, and display the decoded video data.

Figure 7:
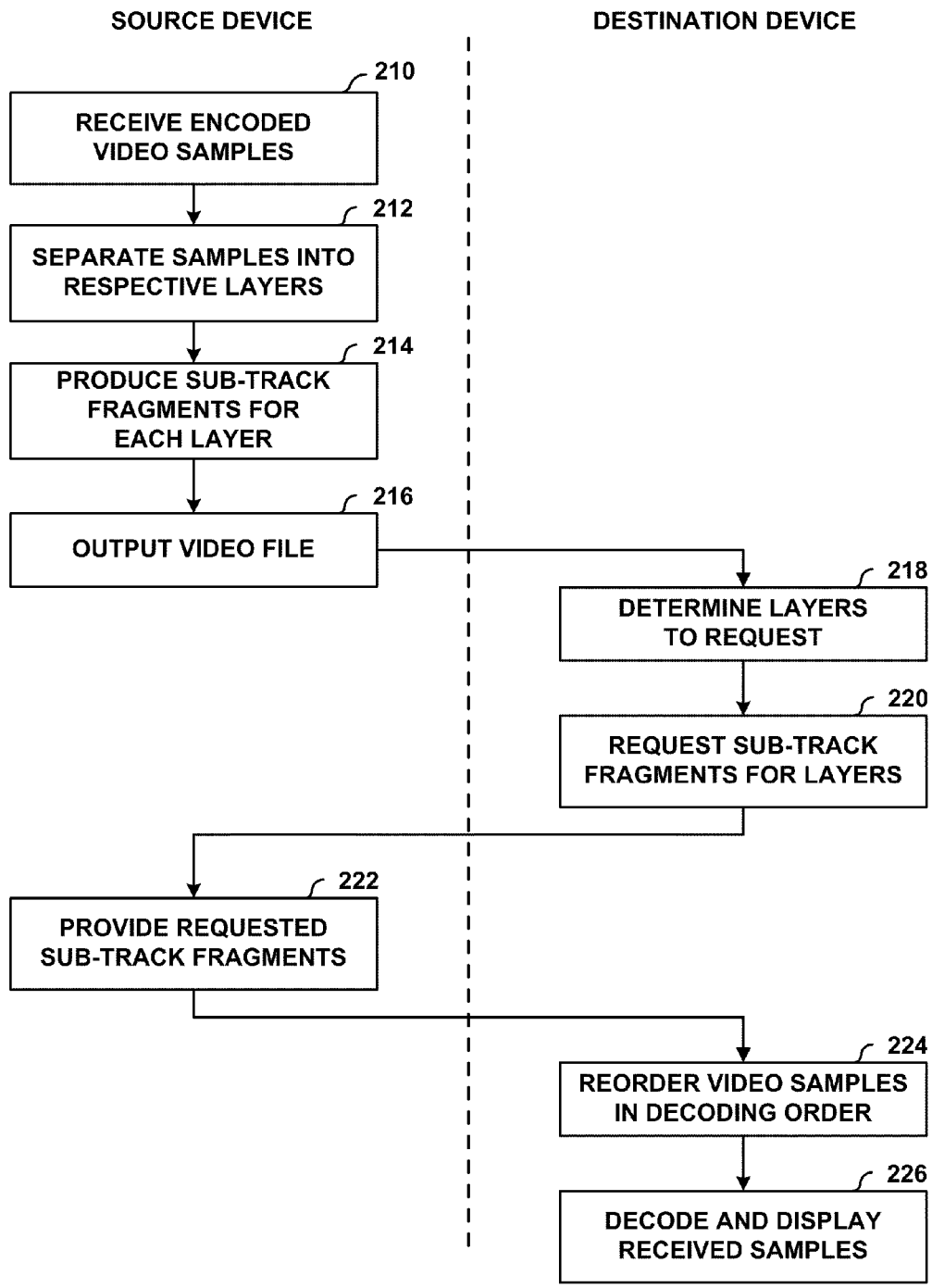
FIG. 7 is a flowchart illustrating an example method for encapsulating video data of common hierarchical levels within respective sub-track fragments of a movie fragment within a video file and providing the video file from a source device to a destination device.

FIG. 7 is a flowchart illustrating an example method for encapsulating video data of common hierarchical levels within respective sub-track fragments of a movie fragment within a video file and providing the video file from a source device to a destination device. Although described with respect to the components of source device 20 and destination device 40 (FIG. 1) for purposes of example and explanation, it should be understood that any suitable device may implement the techniques of FIG. 7.

Source device 20 may first construct a video file. To do so, source device 20 may receive a set of encoded video samples (210). For example, source device 20 may retrieve the encoded video samples from a storage medium or receive the encoded video samples in real time as the samples are encoded, e.g., by video encoder 28. The set of video samples may correspond to a movie fragment within a larger video file. That is, source device 20 may determine that the received set of video samples is to be placed within a common video fragment.

Source device 20 may then separate the samples for the video fragment into respective layers (212). For example, for AVC, source device 20 may separate the video samples into temporal coding layers. As another example, for SVC, source device 20 may separate the video samples into base layer and one or more enhancement layers. As yet another example, for MVC, source device 20 may separate the samples into respective views. In any case, source device 20 may produce sub-track fragments for each respective layer such that the sub-track fragments include coded video samples for the corresponding layer (214). Source device 20 may then output the movie fragment (216). That is, source device 20 may include the movie fragment in a video file stored in a computer-readable medium.

For example, source device 20 may act as a network server to provide data to destination devices in response to HTTP streaming requests. Alternatively, source device 20 may send the movie fragment to a separate network server. In some examples, source device 20 may output the movie fragment by sending the movie fragment directly to a client device.

Source device 20 may produce each movie fragment of a video file. Furthermore, source device 20 may store header data for the video file that identifies byte ranges of each sub-track fragment of each movie fragment. Likewise, source device 20 may include reassembler objects in sub-track fragments that refer to coded samples of previous sub-track fragments. Source device 20 may also include de-multiplexing headers in movie fragments that specify, for example, byte ranges of each sub-track fragment of the movie fragment, a number of samples in each of the sub-track fragments, and/or timing information for the coded video samples.

There are cases that the reassembler objects are not necessary to reorder of the access units in different sub-track fragments to follow the correct decoding order. For example, in MPEG-2 TS, packets containing video data may include a decoding time stamp. Thus, the decoding time of each access unit may be determined, and such a reordering process would not require additional signaling. Also, in some examples, the interleaving of a hierarchical layer with index i and hierarchical layer with index i+1 may follow a fixed pattern and thus very lightweight signaling, e.g., the number of video samples in hierarchical layer i and the other number of video samples following the video samples in hierarchical layer i+1, in a period can be signaled. For example, if the temporal layer 0 pictures are I, $P_4$, $P_8$ etc. and the temporal layer 1 pictures are $B_2$, $B_6$ etc., a simple signaling of (1, 1) may be sufficient for the video samples in the two temporal layers to be reordered correctly. Signaled reordering information for each sub-track fragment may therefore correspond to a sub-track fragment identifier and a number of pictures in the sub-track fragment.

Destination device 40 may then determine one or more layers of the video file to request (218). Destination device 40 may base this decision on various factors such as, for example, a rendering capability of video output 44, a decoding capability of video decoder 48, user preferences, network conditions (e.g., available bandwidth), power levels, memory usage, processing power/usage, or other such factors. Destination device 40 may then request sub-track fragments corresponding to the determined layers (220). In some examples, destination device 40 may use a single HTTP partial Get request for each sub-track fragment. In this manner, destination device 40 may avoid retrieving unnecessary video data and may avoid determining locations of a number of coded samples in a movie fragment that are each hierarchically related, that is, of a common hierarchical layer.

Source device 20 may provide sub-track fragments of the request(s) to destination device 40 (222). After receiving sub-track fragments of a movie fragment, destination device 40 may reorder video samples of the movie fragment, such that the video samples are arranged in a decoding order (224). Then, destination device 40 may decode and display the received samples (226).

Figure 8:
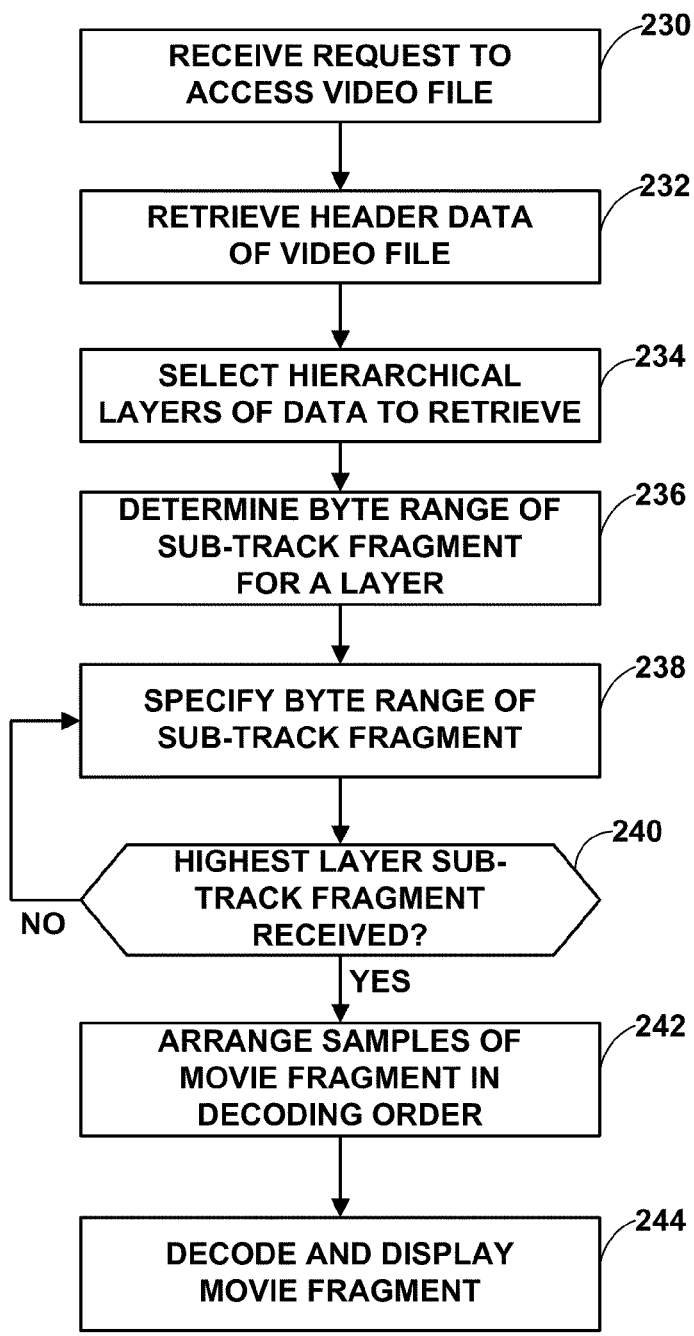
FIG. 8 is a flowchart illustrating an example method for retrieving sub-track fragments of a movie fragment using a streaming protocol.

FIG. 8 is a flowchart illustrating an example method for retrieving sub-track fragments of a movie fragment. Although described with respect to the components of destination device 40 (FIG. 1) for purposes of example and explanation, it should be understood that any suitable device may implement the techniques of FIG. 8.

Initially, destination device 40 may receive a request to access a video file (230). For example, a user may execute a web browser using destination device 40 to request a URL or URN of the video file. In response to this request, destination device 40 may load header data of the video file (232). The header data may describe how the video file is organized, and may signal that the video file is arranged in accordance with the techniques of this disclosure such that coded video samples of movie fragments are arranged according to hierarchical layers of the coded video samples. The header data may further describe each of the hierarchical layers of the video file, e.g., byte ranges for the sub-track fragments within the movie fragment. The header data may also indicate that sub-track fragments of movie fragments of the video file include coded video samples of a common hierarchical layer, as described in this disclosure.

Destination device 40 may then determine which of the hierarchical layers to retrieve (234). Based on this determination, destination device 40 may determine byte ranges of each of the sub-track fragments corresponding to the hierarchical layers to be retrieved (236). Destination device 40 may continue issue individual requests that specify the byte range of a corresponding sub-track fragment to be retrieved (238), until all desired sub-track fragments have been received (240).

After receiving all desired sub-track fragments, demultiplexing unit 38 of destination device 40 may reorder the received samples such that the samples are in a decoding order (242). Demultiplexing unit 38 may then forward the samples to video decoder 48 for decoding, which may forward decoded video samples to video output 44 to be displayed (244).

The method of FIG. 8 portrays an example of a method including receiving, by a client device, information from a source device that describes hierarchical levels of video data for a movie fragment, determining a subset of the hierarchical levels of video data to request, for each of the hierarchical levels of the subset, sending no more than one request to the source device to retrieve all of the video data of the movie fragment at the hierarchical level, receiving the video data of the determined subset of the hierarchical levels, and decoding and displaying the received video data. By sending no more than one request to the source device, the destination device may send a single request to retrieve data from a number of desired hierarchical layers, or may send up to one request per desired hierarchical layer.

Figure 9:
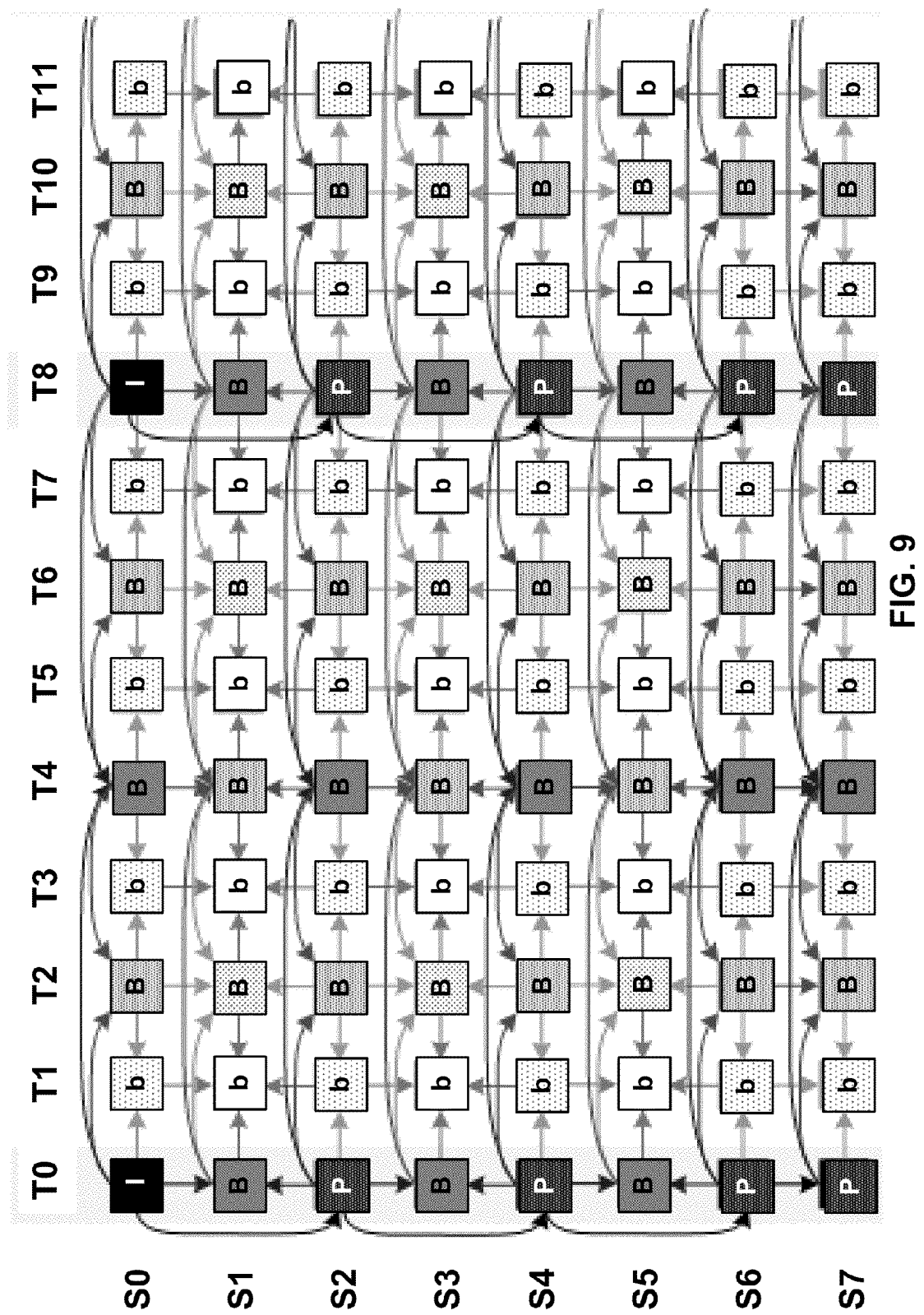
FIG. 9 is a conceptual diagram illustrating an example MVC prediction pattern.

FIG. 9 is a conceptual diagram illustrating an example MVC prediction pattern. In the example of FIG. 9, eight views (having view IDs "S0" through "S7") are illustrated, and twelve temporal locations ("T0" through "T11") are illustrated for each view. That is, each row in FIG. 9 corresponds to a view, while each column indicates a temporal location.

Although MVC has a so-called base view which is decodable by H.264/AVC decoders and stereo view pair could be supported also by MVC, the advantage of MVC is that it could support an example that uses more than two views as a 3D video input and decodes this 3D video represented by the multiple views. A renderer of a client having an MVC decoder may expect 3D video content with multiple views. An anchor view component and a non-anchor view component in a view can have different view dependencies. For example, anchor view components in view S2 depend on the view components in view S0. However, non-anchor view components in view S2 do not depend on view components in other views.

Frames in FIG. 9 are indicated for each row and each column in FIG. 9 using a shaded block including a letter, designating whether the corresponding frame is intra-coded (that is, an I-frame), or inter-coded in one direction (that is, as a P-frame) or in multiple directions (that is, as a B-frame). In general, predictions are indicated by arrows, where the pointed-to frame uses the point-from object for prediction reference. For example, the P-frame of view S2 at temporal location T0 is predicted from the I-frame of view S0 at temporal location T0.

As with single view video encoding, frames of a multiview video coding video sequence may be predictively encoded with respect to frames at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, frames may be inter-view predicted. That is, a view component can use the view components in other views for reference. In MVC, for example, inter-view prediction is realized as if the view component in another view is an inter-prediction reference. The potential inter-view references may be signaled in a Sequence Parameter Set (SPS) MVC extension and can be modified by the reference picture list construction process, which enables flexible ordering of the inter-prediction or inter-view prediction references. Table 3 below provides an example definition for an MVC extension sequence parameter set.

TABLE 3

| | C | Descriptor |
|---|---|---|
| seq_parameter_set_mvc_extension( ) { | | |
|   num_views_minus1 | 0 | ue(v) |
|   for( i = 0; i <= num_views_minus1 i++ ) | | |
|     view_id[ i ] | 0 | ue(v) |
|   for( i = 1; i <= num_views_minus1; i++ ) { | | |
|     num_anchor_refs_l0[ i ] | 0 | ue(v) |
|     for( j = 0; j < num_anchor_refs_l0[ i ]; j++ ) | | |
|       anchor_ref_l0[ i ][ j ] | 0 | ue(v) |
|     num_anchor_refs_l1 [ i ] | 0 | ue(v) |
|     for( j = 0; j < num_anchor_refs_l1[ i ]; j++ ) | | |
|       anchor_ref_l1[ i ][ j ] | 0 | ue(v) |
|   } | | |
|   for( i = 1; i <= num_views_minus1; i++ ) { | | |
|     num_non_anchor_refs_l0[ i ] | 0 | ue(v) |
|     for( j = 0; j < num_non_anchor_refs_l0[ i ]; j++ ) | | |
|       non_anchor_ref_l0[ i ][ j ] | 0 | ue(v) |
|     num_non_anchor_refs_l1[ i ] | 0 | ue(v) |
|     for( j = 0; j < num_non_anchor_refs_l1[ i ]; j++ ) | | |
|       non_anchor_ref_l1[ i ][ j ] | 0 | ue(v) |
|   } | | |
|   num_level_values_signalled_minus1 | 0 | ue(v) |
|   for(i = 0; i<= num_level_values_signalled_minus1; i++) { | | |
|     level_idc[ i ] | 0 | u(8) |
|     num_applicable_ops_minus1[ i ] | 0 | ue(v) |

TABLE 3-continued

```
    for( j = 0; j <= num_applicable_ops_minus1[ i ];
  j++ ) {
      applicable_op_temporal_id[ i ][ j ]            0   u(3)
      applicable_op_num_target_views_minus1[ i ][ j ] 0  ue(v)
      for( k = 0; k <=
applicable_op_num_target_views_minus1[ i ][ j ]; k++ )
        applicable_op_target_view_id[ i ][ j ][ k ]  0   ue(v)
      applicable_op_num_views_minus1[ i ][ j ]       0   ue(v)
    }
  }
}
```

FIG. 9 provides various examples of inter-view prediction. Frames of view S1, in the example of FIG. 9, are illustrated as being predicted from frames at different temporal locations of view S1, as well as inter-view predicted from frames of frames of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 9, capital "B" and lowercase "b" are intended to indicate different hierarchical relationships between frames, rather than different encoding methodologies. In general, capital "B" frames are relatively higher in the prediction hierarchy than lowercase "b" frames. That is, in the example of FIG. 9, "b" frames are encoded with reference to "B" frames. Additional hierarchical levels may be added having additional bidirectionally-encoded frames that may refer to the "b" frames of FIG. 9. FIG. 9 also illustrates variations in the prediction hierarchy using different levels of shading, where a greater amount of shading (that is, relatively darker) frames are higher in the prediction hierarchy than those frames having less shading (that is, relatively lighter). For example, all I-frames in FIG. 9 are illustrated with full shading, while P-frames have a somewhat lighter shading, and B-frames (and lowercase b-frames) have various levels of shading relative to each other, but always lighter than the shading of the P-frames and the I-frames.

In general, the prediction hierarchy is related to view order indexes, in that frames relatively higher in the prediction hierarchy should be decoded before decoding frames that are relatively lower in the hierarchy, such that those frames relatively higher in the hierarchy can be used as reference frames during decoding of the frames relatively lower in the hierarchy. A view order index is an index that indicates the decoding order of view components in an access unit. The view order indices is implied in the SPS MVC extension, as specified in Annex H of H.264/AVC (MVC amendment). In the SPS, for each index i, the corresponding view_id is signaled. The decoding of the view components shall follow the ascending order of the view order index. If all the views are presented, then the view order indexes are in a consecutive order from 0 to num_views_minus_1.

In this manner, frames used as reference frames may be decoded before decoding the frames that are encoded with reference to the reference frames. A view order index is an index that indicates the decoding order of view components in an access unit. For each view order index i, the corresponding view_id is signaled. The decoding of the view components follows the ascending order of the view order indexes. If all the views are presented, then the set of view order indexes comprises a consecutively ordered set from zero to one less than the full number of views.

For certain frames at equal levels of the hierarchy, decoding order may not matter relative to each other. For example, the I-frame of view S0 at temporal location T0 is used as a reference frame for the P-frame of view S2 at temporal location T0, which is in turn used as a reference frame for the P-frame of view S4 at temporal location T0. Accordingly, the I-frame of view S0 at temporal location T0 should be decoded before the P-frame of view S2 at temporal location T0, which should be decoded before the P-frame of view S4 at temporal location T0. However, between views S1 and S3, a decoding order does not matter, because views S1 and S3 do not rely on each other for prediction, but instead are predicted only from views that are higher in the prediction hierarchy. Moreover, view S1 may be decoded before view S4, so long as view S1 is decoded after views S0 and S2.

To be clear, there may be a hierarchical relationship between frames of each view as well as the temporal locations of the frames of each view. With respect to the example of FIG. 9, frames at temporal location T0 are either intra-predicted or inter-view predicted from frames of other views at temporal location T0. Similarly, frames at temporal location T8 are either intra-predicted or inter-view predicted from frames of other views at temporal location T8. Accordingly, with respect to a temporal hierarchy, temporal locations T0 and T8 are at the top of the temporal hierarchy.

Frames at temporal location T4, in the example of FIG. 9, are lower in the temporal hierarchy than frames of temporal locations T0 and T8 because frames of temporal location T4 are B-encoded with reference to frames of temporal locations T0 and T8. Frames at temporal locations T2 and T6 are lower in the temporal hierarchy than frames at temporal location T4. Finally, frames at temporal locations T1, T3, T5, and T7 are lower in the temporal hierarchy than frames of temporal locations T2 and T6.

In accordance with the techniques of this disclosure, each of the views illustrated in FIG. 9 may be considered to correspond to a respective hierarchical level. The techniques of this disclosure may be used to separate video samples for each view into respective sub-track fragments. That is, a movie fragment including video samples of views 1–N may be constructed such that samples of view X (where 1<=X<=N) are stored in a sub-track fragment, and the samples may be stored contiguously within the movie fragment.

In one or more examples, the functions described may be implemented in hardware, software, firmware, or any combination thereof. If implemented in software, the functions may be stored on or transmitted over as one or more instructions or code on a computer-readable medium, and the instructions may be executed by a processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transient or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of outputting encoded video data, the method comprising:
   assembling encoded video data into a fragment of a video file, the fragment comprising a plurality of sub-track fragments, each of the sub-track fragments comprising a plurality of hierarchically related coded video pictures of the encoded video data arranged continuously in decoding order within the respective sub-track fragment, wherein the hierarchically related coded video pictures of each of the sub-track fragments correspond to a common hierarchical layer for the corresponding sub-track fragment;
   receiving a request in accordance with a streaming protocol, wherein the request specifies at least one of the sub-track fragments; and
   in response to the request, outputting the hierarchically related coded video pictures of the at least one of the plurality of sub-track fragments.

2. The method of claim 1, further comprising signaling reordering information that indicates how to reorder the coded video pictures of more than one of the sub-track fragments into a decoding order.

3. The method of claim 2, wherein signaling reordering information comprises:
   producing a reassembler object that references a coded video picture of a first one of the plurality of sub-track fragments; and
   storing the reassembler object in a second one of the plurality of sub-track fragments.

4. The method of claim 3, wherein producing the reassembler object comprises producing the reassembler object to include an index value for the first one of the plurality of sub-track fragments and a position value that indicates a position of the sample in the first one of the plurality of sub-track fragments.

5. The method of claim 2,
   wherein signaling reordering information comprises signaling, for each sub-track fragment, a sub-track fragment identifier and a number of pictures in the sub-track fragment, the method further comprising:
   arranging the sub-track fragments such that the sub-track fragments follow a fixed pattern.

6. The method of claim 1, wherein the video file is associated with a distinct uniform resource locator (URL).

7. The method of claim 6, wherein receiving the request comprises receiving an HTTP partial GET request that specifies the URL of the video file and a byte range corresponding to the at least one of the plurality of sub-track fragments.

8. The method of claim 6, wherein the plurality of sub-track fragments comprise a first sub-track fragment, a second sub-track fragment, and a third sub-track fragment, wherein the first sub-track fragment includes a first set of hierarchically related coded video pictures at a first layer of a hierarchy, wherein the second sub-track fragment includes a second set of hierarchically related coded video pictures at a second layer of the hierarchy greater than the first layer, and wherein the third sub-track fragment includes a third set of hierarchically related coded video pictures at a third layer of the hierarchy greater than the first layer and the second layer, wherein receiving the request comprises receiving an HTTP partial GET request that specifies the URL of the video file and a byte range corresponding to the first sub-track fragment and the second sub-track fragment, and wherein outputting comprises outputting the first set of hierarchically related coded video pictures at the first layer of the hierarchy and outputting the second set of hierarchically related coded video pictures at the second layer of the hierarchy without outputting the third set of hierarchically related coded video pictures at the third layer of the hierarchy.

9. The method of claim 1, wherein the video file comprises a first video file of a plurality of video files of media content, the first file corresponding to a first temporal section of the media content, the method further comprising assembling encoded video data for the media content into the plurality of video files, each of the video files corresponding to a respective temporal section of the media content.

10. The method of claim 9, wherein each of the video files is associated with a distinct uniform resource locator (URL), such that the URL for the first video file is different than a URL of a second video file of the plurality of video files, the second video file being different than the first video file.

11. The method of claim 9, wherein the fragment of the first video file corresponds to a sub-temporal section of the first temporal section to which the first video file corresponds.

12. The method of claim 1, further comprising producing a sub-track fragment header that specifies a byte range for at least one of the plurality of sub-track fragments.

13. The method of claim 12, further comprising outputting the sub-track fragment header before outputting the plurality of hierarchically related video pictures of the at least one of the plurality of sub-track fragments.

14. The method of claim 1, wherein the request comprises a hypertext transfer protocol (HTTP) partial GET request that specifies a byte range corresponding to the at least one of the plurality of sub-track fragments.

15. The method of claim 1, further comprising defining, in an initialization fragment of a media file including the sub-track fragments, at least one operation point corresponding to a subset of the plurality of sub-track fragments.

16. An apparatus for outputting encoded video data, the apparatus comprising:
an interface configured to output data according to a streaming protocol; and
a control unit configured to assemble encoded video data into a fragment of a video file, the fragment comprising a plurality of sub-track fragments, each of the sub-track fragments comprising a plurality of hierarchically related video pictures of the encoded video data arranged continuously in decoding order within the respective sub-track fragment, wherein the hierarchically related video pictures of each of the sub-track fragments correspond to a common hierarchical layer for the corresponding sub-track fragment, receive a request in accordance with the streaming protocol, wherein the request specifies at least one of the plurality of sub-track fragments, and, in response to the request, cause the interface to output the hierarchically related video pictures of the at least one of the sub-track fragments.

17. The apparatus of claim 16, wherein the control unit is further configured to produce a reassembler object that references a sample of a first one of the plurality of sub-track fragments, and store the reassembler object in a second one of the plurality of sub-track fragments.

18. The apparatus of claim 17, wherein the control unit is configured to produce the reassembler object to include an index value for the first one of the plurality of sub-track fragments and a position value that indicates a position of the sample in the first one of the plurality of sub-track fragments.

19. The apparatus of claim 16, wherein the control unit is configured to produce a sub-track fragment header that specifies a byte range for at least one of the plurality of sub-track fragments.

20. The apparatus of claim 19, wherein the control unit is configured to output the sub-track fragment header before outputting the plurality of hierarchically related video pictures of the at least one of the plurality of sub-track fragments.

21. The apparatus of claim 16, wherein the request comprises a hypertext transfer protocol (HTTP) partial GET request that specifies a byte range corresponding to the at least one of the plurality of sub-track fragments.

22. The apparatus of claim 16, wherein the control unit is configured to define, in an initialization segment of a media file including the sub-track fragments, at least one operation point corresponding to a subset of the plurality of sub-track fragments.

23. The apparatus of claim 16, wherein the apparatus comprises at least one of:
an integrated circuit;
a microprocessor; and
a wireless communication device that includes the control unit.

24. An apparatus for outputting encoded video data, the apparatus comprising:
means for assembling encoded video data into a fragment of a video file, the fragment comprising a plurality of sub-track fragments, each of the sub-track fragments comprising a plurality of hierarchically related video pictures of the encoded video data arranged continuously in decoding order within the respective sub-track fragment, wherein the plurality of hierarchically related video pictures of each of the sub-track fragments correspond to a common hierarchical layer for the corresponding sub-track fragment;
means for receiving a request in accordance with a streaming protocol, wherein the request specifies at least one of the plurality of sub-track fragments; and
means for outputting the plurality of hierarchically related video pictures of the at least one of the plurality of sub-track fragments in response to the request.

25. The apparatus of claim 24, further comprising:
means for producing a reassembler object that references a sample of a first one of the plurality of sub-track fragments; and
means for storing the reassembler object in a second one of the plurality of sub-track fragments.

26. The apparatus of claim 25, wherein the means for producing the reassembler object comprises means for producing the reassembler object to include an index value for the first one of the plurality of sub-track fragments and a position value that indicates a position of the sample in the first one of the plurality of sub-track fragments.

27. The apparatus of claim 24, further comprising means for producing a sub-track fragment header that specifies a byte range for at least one of the plurality of sub-track fragments.

28. The apparatus of claim 27, further comprising means for outputting the sub-track fragment header before outputting the plurality of hierarchically related video pictures of the at least one of the plurality of sub-track fragments.

29. The apparatus of claim 24, wherein the request comprises a hypertext transfer protocol (HTTP) partial GET request that specifies a byte range corresponding to the at least one of the plurality of sub-track fragments.

30. The apparatus of claim 24, further comprising means for defining, in an initialization segment of a media file including the sub-track fragments, at least one operation point corresponding to a subset of the plurality of sub-track fragments.

31. A computer program product comprising a computer-readable storage medium having stored thereon instructions that, when executed, cause a processor of a source device for outputting encoded video data to:
assemble encoded video data into a fragment of a video file, the fragment comprising a plurality of sub-track fragments, each of the sub-track fragments comprising a plurality of hierarchically related video pictures of the encoded video data arranged continuously in decoding order within the respective sub-track fragment, wherein the plurality of hierarchically related video pictures of each of the sub-track fragments correspond to a common hierarchical layer for the corresponding sub-track fragment;
receive a request in accordance with a streaming protocol, wherein the request specifies at least one of the plurality of sub-track fragments; and in response to the request, output the plurality of hierarchically related video pictures of the at least one of the plurality of sub-track fragments.

32. The computer program product of claim 31, further comprising instructions to:
produce a reassembler object that references a sample of a first one of the plurality of sub-track fragments; and
store the reassembler object in a second one of the plurality of sub-track fragments.

33. The computer program product of claim 32, wherein the instructions to produce the reassembler object comprise instructions to produce the reassembler object to include an index value for the first one of the plurality of sub-track fragments and a position value that indicates a position of the sample in the first one of the plurality of sub-track fragments.

34. The computer program product of claim 31, further comprising instructions to produce a sub-track fragment header that specifies a byte range for at least one of the plurality of sub-track fragments.

35. The computer program product of claim 34, further comprising instructions to output the sub-track fragment header before outputting the plurality of hierarchically related video pictures of the at least one of the plurality of sub-track fragments.

36. The computer program product of claim 31, wherein the request comprises a hypertext transfer protocol (HTTP) partial GET request that specifies a byte range corresponding to the at least one of the plurality of sub-track fragments.

37. The computer program product of claim 31, further comprising instructions to define, in an initialization segment of a media file including the sub-track fragments, at least one operation point corresponding to a subset of the plurality of sub-track fragments.

38. A method of receiving encoded video data, the method comprising:
receiving information from a source device that describes hierarchical layers of video data for a movie fragment of a video file, wherein the fragment comprises a plurality of sub-track fragments, each of the sub-track fragments comprising a plurality of hierarchically related coded video pictures of the encoded video data arranged continuously in decoding order within the respective sub-track fragment, wherein the hierarchically related coded video pictures of each of the sub-track fragments correspond to a common hierarchical layer for the corresponding sub-track fragment;
determining a subset of the hierarchical layers of video data to request;
for each of the hierarchical layers of the subset, sending no more than one request, in accordance with a streaming protocol, to the source device to retrieve all of the video data of the movie fragment at the hierarchical layers of the subset;
receiving the video data of the determined subset of the hierarchical layers; and
decoding and displaying the received video data.

39. The method of claim 38, wherein the information that describes the hierarchical layers comprises a sub-track fragment header that specifies, for each of the hierarchical layers, a byte range in the movie fragment of the video data corresponding to the hierarchical layer.

40. The method of claim 38, wherein the received video data comprises a first sub-track fragment for a first hierarchical layer and a second sub-track fragment for a second hierarchical layer, wherein the first sub-track fragment includes a plurality of video pictures, and wherein the second sub-track fragment includes a reassembler object that references one of the plurality of video pictures of the first sub-track fragment, the method further comprising:
arranging a sequence of video pictures from the first sub-track fragment and the second sub-track fragment in decoding order using the reassembler object.

41. The method of claim 38, wherein the information that describes the hierarchical layers comprises an initialization segment of a media file including the video data, wherein the movie box defines an operation point corresponding to the subset of the hierarchical layers, and wherein determining the subset comprises selecting the operation point.

42. An apparatus for receiving encoded video data, the apparatus comprising:
an interface configured to receive information from a source device that describes hierarchical layers of video data for a movie fragment of a video file, wherein the fragment comprises a plurality of sub-track fragments, each of the sub-track fragments comprising a plurality of hierarchically related coded video pictures of the encoded video data arranged continuously in decoding order within the respective sub-track fragment, wherein the hierarchically related coded video pictures of each of the sub-track fragments correspond to a common hierarchical layer for the corresponding sub-track fragment; and
a control unit configured to determine a subset of the hierarchical layers of video data to request, wherein, for each of the hierarchical layers of the subset, the control unit is configured to send no more than one request, in accordance with a streaming protocol, to the source device to retrieve all of the video data of the movie fragment at the hierarchical layer,
wherein the interface is configured to receive the video data of the determined subset of the hierarchical layers in response to the requests.

43. The apparatus of claim 42, wherein the information that describes the hierarchical layers comprises a sub-track fragment header that specifies, for each of the hierarchical layers, a byte range in the movie fragment of the video data corresponding to the hierarchical layer.

44. The apparatus of claim 42, wherein the received video data comprises a first sub-track fragment for a first hierarchical layer and a second sub-track fragment for a second hierarchical layer, wherein the first sub-track fragment includes a plurality of video pictures, and wherein the second sub-track fragment includes a reassembler object that references one of the plurality of video pictures of the first sub-track fragment, and wherein the control unit is configured to arrange a sequence of video pictures from the first sub-track fragment and the second sub-track fragment in decoding order using the reassembler object.

45. The apparatus of claim 42, wherein the information that describes the hierarchical layers comprises an initialization segment of a media file including the video data, wherein the movie box defines an operation point corresponding to the subset of the hierarchical layers, and wherein to determine the subset, the control unit is configured to select the operation point.

46. The apparatus of claim 42, wherein the apparatus comprises at least one of:
an integrated circuit;
a microprocessor; and
a wireless communication device that includes the control unit.

47. An apparatus for receiving encoded video data, the apparatus comprising:

means for receiving information from a source device that describes hierarchical layers of video data for a movie fragment of a video file, wherein the fragment comprises a plurality of sub-track fragments, each of the sub-track fragments comprising a plurality of hierarchically related coded video pictures of the encoded video data arranged continuously in decoding order within the respective sub-track fragment, wherein the hierarchically related coded video pictures of each of the sub-track fragments correspond to a common hierarchical layer for the corresponding sub-track fragment;

means for determining a subset of the hierarchical layers of video data to request;

means for sending, for each of the hierarchical layers of the subset, no more than one request, in accordance with a streaming protocol, to the source device to retrieve all of the video data of the movie fragment at the hierarchical layer;

means for receiving the video data of the determined subset of the hierarchical layers; and means for decoding and displaying the received video data.

48. The apparatus of claim 47, wherein the information that describes the hierarchical layers comprises a sub-track fragment header that specifies, for each of the hierarchical layers, a byte range in the movie fragment of the video data corresponding to the hierarchical layer.

49. The apparatus of claim 47, wherein the received video data comprises a first sub-track fragment for a first hierarchical layer and a second sub-track fragment for a second hierarchical layer, wherein the first sub-track fragment includes a plurality of video pictures, and wherein the second sub-track fragment includes a reassembler object that references one of the plurality of video pictures of the first sub-track fragment, the apparatus further comprising:

means for arranging a sequence of video pictures from the first sub-track fragment and the second sub-track fragment in decoding order using the reassembler object.

50. The apparatus of claim 47, wherein the information that describes the hierarchical layers comprises an initialization segment of a media file including the video data, wherein the movie box defines an operation point corresponding to the subset of the hierarchical layers, and wherein the means for determining the subset comprises means for selecting the operation point.

51. A computer program product comprising a computer-readable storage medium having stored thereon instructions that, when executed, cause a processor of a device for receiving encoded video data to:

receive information from a source device that describes hierarchical layers of video data for a movie fragment of a video file, wherein the fragment comprises a plurality of sub-track fragments, each of the sub-track fragments comprising a plurality of hierarchically related coded video pictures of the encoded video data arranged continuously in decoding order within the respective sub-track fragment, wherein the hierarchically related coded video pictures of each of the sub-track fragments correspond to a common hierarchical layer for the corresponding sub-track fragment;

determine a subset of the hierarchical layers of video data to request;

for each of the hierarchical layers of the subset, send no more than one request, in accordance with a streaming protocol, to the source device to retrieve all of the video data of the movie fragment at the hierarchical layer;

receive the video data of the determined subset of the hierarchical layers; and decode and display the received video data.

52. The computer program product of claim 51, wherein the information that describes the hierarchical layers comprises a sub-track fragment header that specifies, for each of the hierarchical layers, a byte range in the movie fragment of the video data corresponding to the hierarchical layer.

53. The computer program product of claim 51, wherein the received video data comprises a first sub-track fragment for a first hierarchical layer and a second sub-track fragment for a second hierarchical layer, wherein the first sub-track fragment includes a plurality of video pictures, and wherein the second sub-track fragment includes a reassembler object that references one of the plurality of video pictures of the first sub-track fragment, the computer-readable storage medium further comprising instructions to:

arrange a sequence of video pictures from the first sub-track fragment and the second sub-track fragment in decoding order using the reassembler object.

54. The computer program product of claim 51, wherein the information that describes the hierarchical layers comprises an initialization segment of a media file including the video data, wherein the movie box defines an operation point corresponding to the subset of the hierarchical layers, and wherein the instructions to determine the subset comprise instructions to select the operation point.

* * * * *